(12) United States Patent
Mayer et al.

(10) Patent No.: US 7,899,290 B2
(45) Date of Patent: Mar. 1, 2011

(54) SYSTEM AND METHOD FOR TRANSFERRING MUCH MORE INFORMATION IN OPTIC FIBER CABLES BY SIGNIFICANTLY INCREASING THE NUMBER OF FIBERS PER CABLE

(76) Inventors: Yaron Mayer, Jerusalem (IL); Al J. C. Baur, Kibbutz Ramat Hashofet (IL)

( * ) Notice: Subject to any disclaimer, the term of this patent is extended or adjusted under 35 U.S.C. 154(b) by 190 days.

(21) Appl. No.: 12/039,867

(22) Filed: Feb. 29, 2008

(65) Prior Publication Data
US 2009/0059966 A1  Mar. 5, 2009

Related U.S. Application Data

(63) Continuation-in-part of application No. 11/162,105, filed on Aug. 29, 2005, now abandoned, which is a continuation-in-part of application No. 10/307,422, filed on Nov. 27, 2002, now abandoned, which is a continuation-in-part of application No. PCT/IL01/01075, filed on Nov. 21, 2001.

(60) Provisional application No. 60/339,693, filed on Dec. 10, 2001, provisional application No. 60/335,295, filed on Nov. 27, 2001, provisional application No. 60/266,731, filed on Feb. 5, 2001.

(51) Int. Cl.
    *G02B 6/44* (2006.01)
(52) U.S. Cl. .................... 385/100; 385/114
(58) Field of Classification Search .......... None
    See application file for complete search history.

(56) References Cited

U.S. PATENT DOCUMENTS

| | | | | |
|---|---|---|---|---|
| 3,844,752 A | * | 10/1974 | Kaiser | 65/393 |
| 4,468,088 A | * | 8/1984 | van der Hoek | 385/111 |
| 5,163,116 A | * | 11/1992 | Oestreich et al. | 385/111 |
| 5,663,822 A | * | 9/1997 | Fee | 398/95 |
| 6,434,295 B1 | * | 8/2002 | MacCormack et al. | 385/27 |
| 6,687,438 B2 | * | 2/2004 | Park | 385/114 |
| 6,757,465 B1 | * | 6/2004 | Yokokawa et al. | 385/113 |

FOREIGN PATENT DOCUMENTS

JP  6-88928 A  *  3/1994

* cited by examiner

*Primary Examiner*—Mike Stahl

(57) ABSTRACT

The present invention enables putting much more optic fibers per cable, such as for example even 1,000 or 10,000 times more than the prior art, with an increase in cost that is orders of magnitude smaller. One of the most important variations is using multi-fiber flexible flat jackets that can move freely within the cable's pipe, preferably only in one direction. Preferably at certain intervals (for example every few dozen centimeters or more or 1 or 2 meters or more) the flat jackets are preferably stitched together to each other and/or for example glued and/or otherwise coupled to each other in a way that preferably does not apply pressure to the optic fibers, and preferably are also coupled, preferably at the stitch position, also to the cable, in order to prevent undesired sliding movement of the jackets against each other and/or against the pipe and/or rotating out of orientation.

11 Claims, 8 Drawing Sheets

US 7,899,290 B2

SYSTEM AND METHOD FOR TRANSFERRING MUCH MORE INFORMATION IN OPTIC FIBER CABLES BY SIGNIFICANTLY INCREASING THE NUMBER OF FIBERS PER CABLE

This patent application is a continuation-in part of U.S. application Ser. No. 11/162,105 of Aug, 29, 2005, now abandoned which is a CIP of U.S. application Ser. No. 10/307,422 of Nov. 27, 2002 now abandoned (which is a CIP of PCT application PCT/IL 01/01075 (which was filed in Israel on Nov. 21, 2001 and claims priority from Israeli patent application 139810 of Nov. 21, 2000 and from U.S. provisional patent application 60/266731 of Feb. 5, 2001), and which also claims benefit and priorities from U.S. Provisional applications 60/335,295 of Nov. 27, 2001 and 60/339,693 of Dec. 10, 2001), and which also claims priority from British application GB 0517390.1 of Aug. 26, 2005, hereby incorporated by reference in its entirety. All of the above applications are hereby incorporated by reference in their entireties.

This application also claims priority from British application GB 0800643.9 of Jan. 15, 2008 and from British application GB0803680.8 of Feb. 28, 2008, hereby incorporated by reference in their entireties.

Therefore, priority and benefit is claimed from all of the above mentioned applications, and all of them are hereby incorporated by reference in their entireties.

BACKGROUND OF THE INVENTION

1. Field of the Invention

The present invention relates to broadband information transfer through optic fibers, and more specifically to a System and method for transferring much more information in optic fiber cables by significantly increasing the number of fibers per cable and/or by using multiple cores per each fiber, for example by using preferably flatter fibers, each with multiple hollow cores, each core preferably surrounded by smaller tunnels that create a light band-gap around each such core (which enables much better reflection). In order to enable this, the present invention solves various mechanical, optic and electronic problems that are created by stacking much more fibers in the same space.

2. Background

With the current explosion of information transfer, optic fibers are becoming faster all the time. Most of the recent advances in the amounts of data that these fibers can carry per time unit have come from adding more and more wavelengths (termed wavelengths) to the same fiber at the same time, a method which is called DWDM (Dense Wave Division Multiplexing). The biggest obstacle to this was the lack of suitable amplifiers, until the Erbium amplifiers were discovered in the late 80's, which have 2 advantages: 1. They don't need to convert the optical signals to electricity and back, but instead, light in the feeble input signals stimulates excited Erbium Atoms to emit more light at the same wavelength, 2. Because they preserve the wavelength of the optical signals, they can amplify many wavelengths simultaneously without having to first extract them separately and then recombine them after amplification. However, use of DWDM has been utilized only in the last few years. Today a single optic fiber can carry up to 80 or even 160 different wavelengths simultaneously, and the number is likely to increase further. The fastest bit-rates achieved so far per each wavelength are around 10 or 40 Gigabit per second, but it will be hard to go much beyond this, since higher bit-rates have much lower tolerance to dispersion problems. Therefore, the present wisdom concentrates mainly on trying to increase the number of wavelengths per fiber. The upper limit per optic fiber using the present methods is currently estimated to be around 100 terabits per second, and is expected to be achieved within the next 8 years.

However, The demand for broadband communications, fueled mainly by the Internet growth, is still growing by a much faster rate than the growth in the abilities of optic fibers. Typically, this demand has risen in the last few years by a factor of up to 5-fold each year, and this demand will probably continue to grow, as more people join and as users want to use heavier applications, such as for example Video, 3d, virtual reality, and so on. For example, many of the Trans-Atlantic submarine cables laid in the last few years were designed to satisfy demands for a number of years, but were fully used up (fully subscribed for) almost before their installations were finished. Trying to condense for example more wavelengths in each fiber is expensive and advances are not fast enough. On the other hand, other avenues for giant leaps have not been explored enough yet, and one of the things that can be tremendously improved almost instantly is the number of fibers per cable, a fact which the "current wisdom" seems to ignore at present. Typically, submarine cables each contain only 4-8 actual optic fiber pairs, or at most 16 pairs (in each pair one fiber typically transfers information in one direction and the other fiber in the other direction). This is a very small number and demonstrates some kind of myopia or fallacy in the prior art in this area. There are already about 300 such submarine cables around the world, and also a large number of land cables, so the current wisdom seems to be laying each time a cable with just a few optic fiber pairs, and then laying a new cable each time it is used-up. As will be shown below, this is very wasteful, apart from the fact that it is also less desirable ecologically (since submarine cables can damage for example coral on the sea floor, etc.). It is true that until the erbium amplifiers started to be used, adding more fibers to the cable was very expensive, because very expensive electro-optical repeaters were used, which converted the optic bits to electricity and after amplification back to optics. Each repeater station of this kind was able to handle only very few fibers, and adding more fibers would make it much more expensive. However, since the TAT-12/13 submarine cable (TAT stands for Trans-ATlantic), which entered service in 1996 and started using the Erbium amplifiers, this problem is now smaller. Yet, the "conventional wisdom" in this area has still not considered yet the possibility and implications of adding much more fibers per cable. Although there are indeed still problems involved in doing this even with Erbium and/or Raman amplifiers, the present invention tries to solve these problems in a very cost-effective way.

SUMMARY OF THE INVENTION

The present invention tries to achieve a large leap in thinking in this area by trying to explore dimensions that haven't been explored sufficiently by the "present wisdom". The main embodiments of this concept discussed in this patent request are trying to transfer much more information in these cables by putting much more fibers per cable, such as for example even 1,000 or 10,000 times more than what is being done today. One of the elements that seem to be most in need of improvement, is the number of fibers in each cable. Considering the high cost of the external metal shield of submarine cables (typically about $20 per meter) compared to the very cheap price of the fibers themselves (typically just a few cents per meter for a group of fibers), and the fact that long distance fibers are typically extremely thin (typically with a core of about 6-10 micron, which is about 10-15 times thinner than a human hair), and considering the fact that the metal pipe size is usually about 2.5-5 centimeters in diameter, it follows that even if the internal diameter of this metal pipe is only 1 centimeter wide, a much larger number of fibers can be put in each cable—for example 1,000 or even 10,000 and still there will be a lot of free space in the metal pipe. (A diameter of 1 centimeter, which is $1/100$ of a meter, is a thousand times larger than 10 micron, which is $1/100,000$ of a meter, so given the square of it, even a few hundreds of thousands of 10 micron fibers can be put together there). However, in the prior art long distance optic fibers have a much thicker cladding, so that the total diameter of the fiber is usually either around 125 micron or around 80 micron. Of course the 80 micron fiber is better than the 125, since it takes up less space and also has a considerably lower bending loss, so today the trend is to move from 125 micron fibers to 80, and today there are even 40 micron fibers starting to be available. Theoretically the cladding thickness should be at least around 10 times the wavelength in order to keep the losses at minimum, so for example when using light wavelengths around 1550 nm a cladding thickness of about 15 micron on each side is more or less the minimum for avoiding increase of losses, and also in order to avoid losses due to tunneling, the minimum required cladding thickness is approximately around 12 micron, so this thickness is again close to the minimum. Therefore, the new 40 Micron fibers seem to be near the minimum for the normal type of core and cladding materials. But even so, for example with a coating thickness of for example 1 micron or for example a few microns, or even for example a few dozen microns (preferably made of some flexible, preferably strong material, preferably polymer), or any other thickness lower or considerably lower than for example 75 micron (the usual diameter of the standard 125 micron fibers is around 250 micron together with the coating, which means a thickness of around 62.5 micron on each side), much more fibers can be packed together. For example if the coating thickness is 10 micron on each side, then the 40 micron fibers (10 micron core+15 micron cladding thickness on each side) will have altogether a diameter of 60 micron. So for example in 1 square mm for example there can be 256 such fibers, and for example in 1 square cm there can be for example 25,600 such fibers, and for example if the internal diameter of the pipe is even just 2 cm, then these 25,600 fibers would occupy less than 25% of the space, so most of the remaining space can preferably be used for allowed movement to compensate against stress caused by the bending of the cable. However, usually the pipe has a diameter of around 5 cm, so it has even much more available space than that, since with such a diameter the inner space can be for example near 15-20 square cm). However, by preferably using for example holey fibers, for example with wavelengths of around 200 nano and/or less (extreme UV), the minimum cladding required would be around 2 microns on each side (and the tunneling distance should also be reduced proportionally), so for example with a core of around 1-2 micron with such frequencies and a cladding of for example 2 microns on each side, each fiber can have for example a diameter of 4 micron, and for example with a coating of 2 microns thickness on each side, the entire fiber can have for example an outer diameter of 10 microns. Similarly, for example if the wavelengths used are between 200-400 nm, the fiber can have for example a holey core of 2-4 microns and the cladding can be for example 4 microns on each side, so for example with a 5 micron coating thickness the fiber can have an entire diameter of around 25 microns. Or for example the wavelength is for example 200-700 nano and thus the cladding is for example of 7 micron in thickness on each side, and for example the core is 4-5 microns, and the coating is for example only 3 micron on each side, so altogether the fiber would still have a total diameter of around 27 micron. Or for example the wavelengths used are for example up to 1000 nm, for example with a core diameter of 3-8 micron and for example a cladding of around 10 micron thickness and a coating of for example 5 or less micron thickness on each side (or for example 3 microns), thus reaching a total fiber diameter of for example 30-38 micron. This means for example that 1 square mm of closely packed 25 micron fibers can contain around 1600 fibers. As explained below, by using for example flat multi-fiber jackets and/or for example multi-layer structures, the coating can be reduced even further, since for example the coating layer between each two adjacent fibers in the flat jackets can be for example a few microns or even less, for example even 1 micron or less, and the flat jacket's thickness can be for example 1 or a few microns (or more) more than the diameter of the fiber. The jacket can be or example created simply by laying the fibers side by side without coating and then coating them together, or for example first coating each fiber for example with a coating layer with a thickness of for example 1 or a few microns or more, and then for example laying them side by side and coating them together. However, since the optic fibers are normally created by drawing and the cladding is typically added by vapor deposition, for example a group coating in the form a flat jacket can be for example added in a similar way or for example through dipping in some solution and/or for example by extrusion and/or for example by gluing the fibers as they are being pulled side by side between two jacket surfaces, and preferably this is done while the fibers are being pulled together side by side, for example in a production line. The gluing has an advantage that if used with the proper materials the mechanical strength of the jacket transfers better between the fibers.

Also, it should be taken into account that the materials themselves are not the only cost in laying such a cable. For example, the work involved typically costs at least about 15% of the entire operation. So putting much more fibers in each cable is actually even more cost-effective. Also, it must be understood that the substance the optic fiber itself is made of—silica—is actually one of the cheapest and most available substances on earth, so as more and more such fibers are mass produced, their price will probably keep dropping even further. So, for example, if we put 10,000 10-micron fiber pairs in a single cable instead of only 8 pairs, and assuming that 8 pairs cost for example 5 cents per meter, the cost per meter will rise from $20 to $82.5 (1,250 times more expensive per meter of fibers is $62.5 instead of $0.05). But this is only about 4 times more expensive than before, whereas compared to 8 pairs, we have now 1,250 times more pairs, so we have a 1,250 times wider bandwidth. This example shows that it is indeed tremendously more cost-effective, since, assuming for example that much more companies will want to be a partner in such a venture and buy-up small parts of it, the total price per participant company will be much cheaper than today. And when using this in overland cables, the huge jump in price-performance is even much higher, because the external pipe can be thinner and cheaper. Also, when used for example in metro areas to create connectivity within and between large cities, typically no or few amplifier stations are needed, so the price-performance of adding much more fibers can be even higher. This can also make the Internet usage much cheaper to the end users, so they will have both a much faster Internet and much cheaper access. So unlike the normal advances in this area, which typically today double the bandwidth each year, the present invention allows for a giant leap of for example 1,000 more bandwidth, that can be produced today, and with a much smaller increase in cost. This new approach can be called for example Dense Fiber Multiplexing. The present operations of laying optic fiber cables all over the world are similar to the opening up of the American West by the railways in the 19th century, except that with the current invention we can lay an almost infinite number of "railways" within a very small space. And since DWDM will also probably continue to advance (although at a slower rate) and put more wavelengths into each fiber, the total growth of combining all of this is gigantic.

There are a number of problems that have to be solved in order to make this breakthrough possible:

1. First of all, we have the problem of maintenance. Arguably, such a large number of fibers in each cable will make it much harder to maintain their integrity. But there are a number of solutions to this: First of all, ever since Erbium amplifiers replaced the bulky electro-optical repeaters that existed before, the entire system is much more reliable, so that the typical 8 pair cable usually needs only about 1 repair per 25 years. It is true, however, that having for example a 1,000 times more pairs also increases by the same proportion the chances for malfunctions. But such a system has so much spare room that is should indeed be enough for many broadband providers for many years, so that even if, for example, half of the fibers in this new concept become damaged, the other half will still be enough for quite a long time, even if no repair is done. In other words, there is an additional shift here compared to the prior art in this area, in that we rely much more on the statistics of how many fibers in absolute numbers still remain operational, instead of relying mainly on a small chance for a malfunction over a period of time, and repairing it whenever it happens. However, preferably the system includes also mechanisms for detecting malfunctions as soon as they occur and automatically assigning other fibers instead of the malfunctioning fibers.

2. Secondly, with such a large number of fibers the problem of how to identify each fiber at both ends of the line becomes much less trivial than for example when only 8 pairs are involved. One solution is for example to mark each fiber with a distinct mark, but this is not so practical. Another solution is to preferably group them into smaller groups, for example by wrapping each group with a separate plastic jacket, and marking the jackets for example with a separate color. So, for example, if 10,000 pairs are used, they can be grouped for example into a 100 groups of a 100 pairs each (or for example with separate groups for each direction). This makes the mission of locating matching fibers at the two ends of the cable much easier. Another solution is to hook up all of the fibers to an array of numbered sensors connected to a computer at each end of the cable and then let the two computers communicate and start testing automatically serially each fiber by sending a signal through it from one computer and registering on which sensor it came out at the other end. This way, the two computers can very quickly create a translation table that documents which element on each side corresponds to which element on the other side, but this is much less efficient. A much better solution is to use multi-fiber flat jackets, as explained below (it is also possible to mark for example by separate colors or lines subsections on the jacket). Of course, various combinations of these solutions are also possible.

3. Thirdly, if for example a cable between the USA and Israel cannot be laid in one run, than a "stitch" in mid-ocean is needed, and this becomes much more difficult if you have for example 10,000 optic fiber pairs instead of only 8. The answer is that, first of all, there is usually no such problem, because the ships that install these cables are capable of laying thousands of Kilometers of consecutive cable in one run (typically such a cable for example between Israel and the USA can be laid in one run, taking about one month to do it). If for some reason a much longer cable was needed without a stop on land, then this can still be solved for example by using a larger ship, that can still carry the entire cable in one run, or using for example a group of ships that are connected for example mechanically in a way that enables them to carry together a larger consecutive cable, or using a cable of smaller external diameter. If the smaller cable is less strong, this can be solved for example by using stronger material, or using for example some rings of stronger material embedded every once in a while in the shell of the cable. Another possible variation is to use at sea preferably an automatic fiber-welding machine that can weld two fibers as if they were made in one piece in the factory, although this is more expensive and will slow down the laying process by the time needed to "stitch" so many fibers, so for example if it takes the machine a whole month to weld 20,000 fibers, and 4 such breaks are needed, then it slows down the laying of the cable by 4 months. Also, such stitching might for example degrade a little the performance of some of the fibers, so this solution is less desirable (however, usually it is not more than 1 dB degradation). Another solution is to use for example a water-proof protective shield of smaller external diameter so that much more cable can fit on each wheel, and then preferably add dynamically an external stronger shield which for example comes open and can be externally added to the cable from around it and preferably be sealed automatically during the process of laying the cable. Another solution is to use multi-fiber flat jackets with delta-type connectors that connect for example by pressure or by welding, as explained below. Of course, various combinations of these solutions are also possible.

4. Another problem is that if there are much more fibers within the pipe, there is more danger that they will be damaged by friction or stress or movement against each other for example when laying the cable. Therefor, in one embodiment each fiber is coated by a very thin layer of low friction plastic that preferably does not add more than 1 micron or at most a few microns to the fiber's size. This coating is preferably with the same thermal expansion coefficient as glass, and can also be for example in different colors for groups of fibers, which is also good for the problem of identifying the fibers at both ends, but is preferably opaque and dark at least on the inside, to absorb escaping photons. Preferably, also an anti-friction material is added into the pipe between the fibers, such as for example Talc powder or anti-friction gel. Another possible variation is to put the fibers in larger groups into protective jackets, so that for example we can have about a 100 plastic jackets, each containing for example about 100-200 fibers. Preferably, there is enough extra space within each jacket for the fibers to move freely sideways (and/or up and down) in the jacket in order to compensate for stress caused by bending of the metal pipe. Preferably, there is also enough inner space left between these jackets in the metal pipe for these jackets to move freely sideways (and/or up and down) to compensate for stress caused by bending of the pipe. Another possible variation is suspending the fibers within the pipe in a fluid preferably with specific weight close to that of glass, so that they float freely in the fluid and have less friction. Preferably this fluid is also dark and opaque to light, to avoid possible cross-talk between closely touching fibers and preferably this fluid also helps the pipe resist the pressure of the external water for example in case of a submarine pipe, so that this fluid can be for example even water itself or some water based solution. Another possible variation is to give the fibers an electrostatic charge so that they repel each other and thus have less friction, however it may be difficult to create and maintain this charge. (It could be done for example by applying a high voltage to the fibers at certain intervals and also to an electrically insulating inner coating of the pipe, so that the fibers stay away from each other and from the inner border of the pipe, and also the fibers should be loose enough so as to move relatively freely in response to stress caused by bending of the pipe. The electrostatic charge generated can be carried on to long distances and uses-up only a few watts. By keeping the electrostatic charge not too high, the fibers can stay relatively close to each other, but avoid contact, since the closer they get, their repulsion increases). Another possible variation is to use thinner fibers, so that if we use for example 1 micron fibers instead of 10 micron fibers, they will have more room to move around the inner space of the pipe (however, this would require, of course, using shorter wavelengths for the signals, as explained below). Another preferable variation is to use instead a flat cable, so that for example we have a cable 20 centimeters or even 1 meters wide and for example 2 millimeters high (internally), and the fibers are lying relatively flat or completely flat across the width of the cable. Of course, many sizes are possible. Of course, in this case we need structural strengthening against the pressures that exist for example in deep sea, so we can use for example a wavy socket-like structure between the bottom and the top so that the fibers are in the gaps between the "waves" (and each socket contains for example 1 or dozens or hundreds of fibers), or a cell-structure, so that in each cell are a certain number of fibers and the cell walls support the flat cable from being further flattened by the pressures. The flat-cable solution also makes another very good solution to the problem of identifying the individual fibers. In each cell the cables or groups of cables can also have some protective coating. In all of the above solutions, preferably the fibers are loose enough so as not to accumulate too much tension when the pipe is curved. Another possible variation is to use, preferably together with a flatter metal pipe, a multi-fiber flat, preferably flexible, jacket for the fibers (each containing for example 1000-2000 fibers), so that for example a number of such jackets can be stacked upon each other in the pipe and the pipe has one cell or a number of cells side by side, and preferably the fibers can move freely up and down within the flat jacket to compensate for stress caused by the bending of the pipe, and preferably also the flat jackets themselves can move similarly up and down within the pipe. Also, the flat jackets preferably have the same thermal expansion coefficient as glass. Another possible variation is a preferably flexible, multi-layer, structure that fits preferably in a somewhat flattened pipe, and also preferably allows each fiber to move freely up and down within its "mini-cell", and preferably the structure itself can also move at least up and down in order to compensate for stresses. Another possible variation is using for example one wide flat jacket for all the fibers and rolling it up within the pipe. These various exemplary configurations are described in more detail in FIGS. 10a-d. These flat jackets or multi-layer jackets are preferably made of for example a plastic low friction material. These flat jacket solutions and multi-layer solutions also make it much more convenient to identify the fibers at the two ends of the cable, and can also make it easier to create preferably modular group-connectors at the two ends of the cable. Preferably, this can also make it easy to create modular interfaces at the amplifiers, which can be used with the various solutions described for the amplifiers. (It can also help for example to keep the fibers away from each other at the amplifier in the solution of FIG. 8, by creating a small gap of fibers stripped from the jackets or from the structures and putting the jackets at even distances from each other, so that the jackets on the two sides of the gap of bare fibers keep them in position, and the laser pump beam can hit all of them at the same time). Another possible variation of the pipe that can be used with these flat jackets is for example a double pipe made of two (or more) for example hexagon-shaped pipes with a shared plane between them, or for example two (or more) round pipes welded together side by side. These structures have great structural strength and make sure that the set of pipes will bend only in one direction, however, in both of these variations each of the two (or more) cells are preferably wider than high, so that the width of the flat jacket is greater than the height of the cell, in order to make sure that the flat jackets always keep their correct orientation in relation to the pipe. So preferably either the pipes are still somewhat flattened, or they are round externally but somewhat flattened in their internal space. If the shapes of the 2 or more pipes remain round and not flattened internally, then one way of keeping the flat jackets in the correct orientation is for example to add an elongated square cell in the middle in which the flat jackets reside, and then the top and bottom remaining empty spaces can be used for example for electrical wires. This configuration is shown in FIG. 12. Other variations in the shape of the pipe are also possible. Another possible variation is to put one or more small dense bundles of fibers, each bundle preferably in one jacket, in the pipe, so that the bundles can move freely. For example, a bundle of a little more than 1 mm in diameter can contain about 10,000 densely packed 10-micron fibers. However, packing fibers together at distances of a few wavelengths of the light can cause cross-talk between the fibers. Therefore, another possible variation is to combine this with a very thin coating of flexible preferably opaque material (such as for example plastic, or nylon, or other polymer, or paint, or anodization of metals, etc.), over each fiber, which is preferably black or dark at least on the inside in order to absorb escaped photons and is preferably with the same thermal expansion coefficient as glass, or immersion in an opaque dark liquid or powder (such as for example fine carbon powder). If a coating is used, another variation is preferably to add also slight gaps in the coating or more than one coating material intermittently, preferably with slight gaps, to compensate for thermal expansion problems if the thermal coefficient is not close enough to that of glass. This coating can be also on the outside at least partially marked with a different color for each sub-group of fibers. If a powder or liquid is used, another possible variation is to use also an electrostatic charge to improve the dispersion. Also, sub-groups of fibers can be grouped for example into preferably very thin group-jackets within the larger jacket—for further strengthening and easier identification. This is less efficient than the flat jacket solution since there is no directional optimization, but it still may enable using quite a large number of fibers. Of course, like with the flat jackets, this may work even better with thinner fibers, such as for example a few microns or 1 micron. It is important to emphasize that the multi-fiber flat, preferably flexible, jackets are very different from the "current wisdom" types of optic-fiber jackets, and so are the multi-layer structures that are suggested, and also the for example the flattened metal pipe (with or without a division to inner cells) and the structure of 2 or more welded pipes, and the combination of flat jackets moving freely up and down only in the desired directions in the special pipes, which can bend only in the desired directions, are very different from the round pipes used in the prior art. Of course, various combinations of these solutions can also be used.

5. The biggest problem is again the amplifiers. Eventhough this problem is much less severe than it would have been with the old electro-optical repeaters, it still requires considerable adaptations to enable the Erbium amplifiers to efficiently deal with a much larger number of fibers. Typically these amplifiers are needed about every 80-120 Kilometers, so, for example, for a cable between Israel and the USA (about 7,000 Kilometers), about 70 such amplifiers are needed. The state of the art Erbium amplifiers typically work around about 10 meters of fiber that have been doped with Erbium atoms as an impurity during the manufacturing process of the fiber. At the area of the amplifier, a "laser pump" is used to excite the Erbium atoms and make them increase the strength of the feeble signals. This is done in the current state of the art by supplying electricity to a laser at the amplification area, which has to work with coherent light and at a certain frequency which is close to the range of frequencies of the wavelengths used in the fiber, but not too close, so as not to disrupt the signals. The light from this laser "pump" is then optically coupled to each of the fibers, typically by the use of optical splitters. Typically, for example, in a 10 meter section of erbium-doped fiber, a pump wavelength of 980 nanometers or 1480 nanometers provides about 2.2 dB/milliWatts of amplification (Overall amplification saturates around 25-30 dB). So the cable contains also electrical wiring for supplying the electricity to the laser "pumps". Another new type of amplifier that is just beginning to be used is a Raman Amplifier, which works similarly to the Erbium amplifier, except that no Erbium impurity is needed in the fiber, so that it can work with ordinary optic fibers. It also uses a similar laser pump to boost the signal energy, but has the advantage that instead of a 100 nanometers range where Erbium is most sensitive (roughly between 1500 and 1600 nanometers), the Raman amplifier can work with a 200 nanometers range, and also unlike Erbium, which has this 100 nanometers band at a fixed position, the Raman amplifier can shift the 200 nanometers band to any position, so that a number of amplifiers can be used each with a 200 nanometers shift compared to the previous one, so altogether a much larger range can be used and therefore a larger number of wavelengths can be used (since there is a minimum separation needed between each two adjacent wavelengths). It also makes better separation between the signal and the noise, compared to Erbium amplifiers. The only disadvantage it that it requires higher energy (higher pump powers) for achieving the same effect. But it will probably gradually replace the Erbium amplifiers. Typically, at the area of the amplifier, the pipe becomes larger, in order to accommodate the laser pump or pumps and the interface required for it. Anyway, whether using Erbium amplifiers or Raman amplifiers, or other laser pump or similar technologies that will exist in the future, making arrangements for powering for example 10,000 fiber pairs instead of just 8, is still problematic, and requires sophisticated solutions in order to be cost-effective. A number of solutions to this major problem are described in the detailed descriptions of the preferred embodiments below (Of course, over small distances, such as for example within a single town or between close towns, no amplifiers are needed at all, so this problem does not exist at all):

a. Using a much larger number of small-power laser pumps of the type used today, each supporting only one or a small number of fibers, preferably in multi-pump chips connected to multiple fibers. (When nanotechnologies become available, as explained below, this might become even cheaper and more convenient). The power requirements for the amplifiers will of course be multiplied by the number of laser pumps added at each amplifier station.

b. Using a more powerful laser pump (or pumps) that is capable of amplifying a much larger number of optic fibers, and using various possible methods to distribute this energy to many fibers. Depending on the implementation, this can save for example a lot of expenses on opto-couplers and on the overhead of having to deal with a separate amplifier for each fiber. If we multiply for example the number of fibers 1,000 times more than the numbers used in the prior art, this pump needs of course about a 1,000 times more power, so, if for example 12 milliwatts are needed for a single Erbium doped fiber, than we need now about 12 Watt—still quite reasonable. Another problem is that with powerful lasers it might be difficult to get exactly the needed frequency for the Erbium, since various limitations limit the available frequencies. Therefore, another possible variation is to use for example Raman amplifiers instead, so that more flexibility is available. However, a bigger problem is the higher signal attenuations if other less optimal frequencies are used, because the laser pump can typically only amplify signals which are at wavelengths a little longer than it, so, for example, if the closest powerful lasers work at 1064 nanometers, the signals would have to be for example at 1100-1200 nanometer, which have considerably more losses than for example around 1550 nanometer. There are a few solutions to this: 1. Try to create powerful lasers in more optimal frequencies, for example by mixing various gases used for creating the lasers. 2. Use a combination of two or more lasers, for example, since there are for example powerful Nd:YAG lasers available at 1064 nanometers and at also at 532 nanometers and 355 nanometers (by frequency multiplication), combining the light from both types and preferably filtering out the noises created by the combination, can create a laser of 1596 nanometers or 1419 respectively, or mixing it with other lasers of the visible spectrum (such as for example Helium-Cadmium lasers, which are typically available at 325-442 nanometers, Xenon-Fluoride lasers, which are typically available at 353-459 nanometers, or Argon lasers, which are typically available at 457-528 nanometers) can achieve other desired frequencies (however this has also a price of some reduction in the pump power). However, since these types of lasers typically have low efficiencies, it is better to use for example grouped diode lasers—some are available for example with powers of 50 up to 2000 watt, or quantum-cascade lasers, which can give high-efficiency in almost any desired frequency in the near infra-red range (750-2600 nanometers) and mid infra-red. 3. Use for example interferometric wavelength converters, or a series of Raman amplifiers to shift the laser frequency higher in one or more steps by strongly amplifying each time a signal of longer wavelength with the laser pump, and then using the amplified signal as the new amplification pump. 4. Use fibers with lower losses at the other frequencies. For example, since the main cause of Rayleigh scattering is inhomogenities caused by fluctuations of glass density and compositions, producing more homogenous fibers will probably reduce this, so that signals can be used for example at the range of 1100 nanometers and above with the laser pump of 1060 nanometers. Also, It might be possible to add some materials to the glass that will reduce its losses at these frequencies. for example ZBLAN fibers (which contain Fluoride, Zirconium, Barium, Lanthanum, Aluminum and Sodium) can work at ranges such as 1300-4000 nanometer with attenuations as low as 0.001 dB/Kilometer. Another possible variation, discussed below, is using holofibers (holey fibers), preferably with an optical band-gap of smaller tunnels around each tunnel, so that the optic signals travel through free air, and so there is a much larger range of frequencies available and much smaller attenuation. 5. Use some combination of the above.

c. Use some combination of the above 2 possibilities, for example a number of such lasers, each powering a subset of a large number of fibers.

However, the power requirements for the laser pump (or pumps) might become problematic if we take into account the fact that the laser efficiency is typically relatively low (although there are considerably large variations in efficiency between various types of lasers as explained above), so we have to multiply the previously mentioned power by the laser inefficiency factor, and taking into account the fact that for example on a cable between Israel and the USA approximately 70 amplifiers might be needed, the total amperage needed might be quite high. This is problematic because we then need a thicker electrical wire, which can fill-up too-much of the inner space of the pipe. This could be solved by making the pipe of the cable thicker, but this would make it more difficult to lay the cable in a single run, so this is the least desirable solution. We could also use for example a separate power cable running along the optic fibers cable, but this is also a very expensive solution so this also is less desirable. There are a number of better solutions for this problem:

a. Use higher voltage for carrying the electrical power, which means lower amperage and less thickness needed for the electrical wires. However this can only be done till a certain limit, otherwise a too high voltage can cause problems of electrical leakage, especially when submarine cables are concerned. Preferably, the amplifier areas contain also appropriate transducers for converting the electrical power to the correct voltage needed for empowering the laser pump or pumps. Preferably this is combined also with better insulating layers.

b. Use a multiphase electrical power (typically 3 phases are the most efficient, and 3 power lines are needed for this instead of 2).

c. Since the metal shielded pipe of the cable is itself a bulky element, we can take advantage of it and make this problem part of the solution by using more than one layer of metal for this shield with good electrical isolation between them, so that for example part (or parts) of the metal pipe itself is used as both a strengthening shield and as electrical power lines. Preferably the shield itself is made mostly of material with the same thermal expansion coefficient as glass, but since such alloys might not be the best electrical conductors, we might need to use for the electrical conducting layer materials with a different thermal expansion coefficient. Therefore, preferably these conducting layers are surrounded by flexible electrical insulators, such as for example sponge, so there is enough space to accommodate the different thermal behavior of these layers and for the fact that they can warm up more because of the electrical current. Preferably, these layers can also be made for example somewhat wavy or mesh-like (but still preferably with a big mass) in order to compensate even better for this different thermal behavior. This can be done both in a round cable and in a flat cable.

d. If a cable with more than one cell is used, the electrical wiring can also be inserted for example as an isolated layer within the support wall or walls that are between cells.

e. Use some external power source at the amplifiers, instead of or in addition to the electrical power lines. This can be very easily done in overland cables, and at sea for example geothermic energy might be used, or solar energy, conducted form above, or energy from water currents, or other forms of energy.

f. Use electrical wires made from the newly discovered carbon nanotubes, which can now be created from graphite in mass-quantities. Wires made from these nanotubes (for example Bucky tubes) will have a conductivity 10-100 times higher than copper, and will be about a 100 times stronger than steel and 4-10 times lighter and much more flexible and endurable. Also, adding for example a certain amount of Alkali metal atoms can make them super-conductors. This could also be a good combination for example with solution c, and, in fact, the entire pipe of the cable (or at least some parts or some layers of it) might be made from insulated layers of this material (or some hybrid with this material)—as soon as the material becomes cheap enough to compete with steel. This will enable us to use a pipe with smaller external thickness that will be much stronger than the current pipes, and therefore also solve the problem of laying cables for longer distances consecutively without any stitches needed on the way.

g. Use fibers with lower losses, such as for example ZBLAN fibers, which can work at ranges such as 1300-4000 nanometer with attenuations as low as 0.001 dB/Kilometer, an/or for example holofibers (holey fibers), which means that much less amplifiers are needed on the way.

h. Use various combinations of the above solutions.

These improved amplifiers, although definitely more expensive than normal state of the art amplifier stations that have to deal with just a few fiber pairs, are still just a small ingredient in the cable. So if for example a normal submarine cable between Israel and the USA costs about 250 million Dollars ($20.1 per meter×~7,000 Kilometers, plus some additional expenses) and a similar cable based on the present invention costs about 800 million dollars, then even if each of the approximately 70 amplifier stations costs an extra 1.5 million dollars, it will still be just around 900 million dollars for the entire cable.

6. However, another related problem to the amplifiers problem is the fact that even with Erbium or Raman amplifiers, Regeneration Repeaters are still needed after certain distances in order to restore the shape and timing of the signals, mainly due to chromatic dispersions (caused mainly by the impurities of the wavelengths) and polarization dispersions (caused mainly by asymmetries of the fibers). Having to add regenerators can significantly increase the costs, since electro-optical regenerators are used for every wavelength in every lit fiber. Until recently, for example Erbium amplifiers were needed every 80-120 km, and regeneration was needed typically after 600 km. However, recent advances are beginning to solve this problem and have successfully transferred already DWDM signals over 6400 km without regeneration, and longer distances of 8,000 km and even above 10,000 are also expected soon.

Corvis Corp. for example has accomplished this by using a combination of Distributed Raman amplifiers (which use the fiber itself as the gain medium, so the signal weakens much less over long distance) together with Soliton technology that gives the pulses a special shape that causes their shape to regenerate itself periodically automatically after certain distances. Qtera (bought by Nortel), also uses a similar Soliton technology, together with Erbium amplifiers. Xtera will use a combination of distributed and discrete Raman amplifiers. Marconi (bought by Cisco) has accomplished this, again, by Soliton technology. Optimight is doing it by adding Code Division Multiplexing and using higher power lasers. In addition to this, other solutions are improving Error corrections by better redundancy FEC (Forward Error-Correction) Codes, such as for example Ciena is doing. Another solution is for example correcting the Polarity Mode Dispersion by DSP-controlled compensation upon entering the receiving end, as offered for example by Yafo and by Vitesse. Another solution is fibers with better chromatic dispersion compensation (for example by dispersion slope matching) and/or using more precise lasers (for example by better filtering of each wavelength). Another solution can be optical filtering combined with the optical amplifiers, so that weakened distortions can be deleted. Of course, various combinations of these solutions will probably work even better. Another solution is using for example ZBLAN fibers, which have much lower attenuation, as mentioned above, when they become cheaper. Another solution (shown by Alcatel) is that if and when repeaters are eventually needed, the regeneration can be done optically for example by using SOA (Semiconductor Optical Amplifiers), such as for example a Mach-Zehnder interferometer for 2R regeneration (Reshaping) (because of its non-linear response) and two of these in a cascade for 3R regeneration (Reshaping & Retiming). However, the disadvantage is that for this regeneration the wavelengths still have to be separated and then recombined and each wavelength needs its own repeater. Another possible variation is using holofibers, which have much less attenuation and much less distortions since the optical signals travel through free air. Another possible variation is to design holofibers in which there is a vacuum or reduced air pressure (preferably in combination with a vacuum or reduced air pressure throughout the solid cable, so that there are no forces that can crush the fibers). Of course various combinations of these and other solutions can also be used.

7. Another problem is the price of the lasers at the end stations. Since this equipment is still relatively expensive, few companies will be willing to invest in advance for example in 1,000 fibers, together with 1000 sets of DWDM lasers. However, prices of these lasers will probably continue to go down considerably in the next few years, so for example more and more fibers can be activated gradually on a need basis. But even now, no matter what the price of the end-station equipment is, it is still much more wasteful to have to lay a whole new cable after the small number of fibers have been used up. One possible solution that might help lower the price of DWDM lasers and/or increase their accuracy is to use for example an optically diffractive prism, preferably with alternating opaque and transparent stripes, for optically splitting each laser to discrete sub-frequencies, and then preferably amplify each sub-frequency and modulate it on/off separately for example by using an integrated electro-absorptive modulator or Mach-Zehnder Modulator, or an external Lithium Niobate modulator. This can convert each single less precise laser into a group of more precise lasers (in other words each laser can be used for creating a number of wavelengths simultaneously), as shown in FIG. 13. An even better solution is to optically duplicate each original laser beam preferably many times, and then use preferably separate independent on/off modulation on each of the new laser beams and send each into another fiber, as shown in FIG. 14. This way for example each original more expensive and precise laser can be used simultaneously to independently send separate signals into a preferably large number of fibers. Preferably the splitting is done after the filters that further purify the beam, so this saves also on the typically expensive filters. Preferably, groups of fibers are coupled to multi-laser chips by using flat mutli-fiber jackets and connectors, as described in FIGS. 10, 10a-b & 11a-c. Another possible variation is that preferably the connector at the end individual fibers or for example the other connector that has to connect with the connector end in which the fiber terminates, preferably one of them preferably has a shape like a widening hollow cone and preferably this cone and/or the other connector that goes into it can flexibly bend in any needed direction (preferably in a limited range of angles so that it does not bend out of orientation), and/or for example move in a limited range, so that, even if the fibers are not exactly aligned, the connectors automatically adjust their position. Another solution is for example temporarily using CWDM (Course Wavelength Division Multiplexing) on more fibers, which, at least currently, is cheaper than using DWDM on less fibers. Of course, various combinations of the above and other solutions can also be used, so that for example the wavelengths are first split this way into a larger number of finer sub-range wavelengths, and these sub-wavelengths are then multiplied many times and on/off modulated for example into each fiber (or for example into each tunnel in a multi-core holofiber).

Another variation is using, instead of the type of fibers that exist today and conduct mainly visible light and infrared light, much thinner nanofibers, which have 2 main advantages: a. Much more fibers can be contained in the same space, so that for example if we use fibers with a diameter of a 100 nanometers (a 100 times smaller than 10 micron), we can accordingly put more than 10,000 times more fibers than in the previous solution (of using for example 10 micron fibers) in the same space, or in other words, 10,000×1,000=10 million times more fibers than what is being used today. Of course, the ratio will increase even further if we use fibers with a diameter of a few tens of nanometers or just a few nanometers. b. Secondly, using such thinner fibers is suitable for shorter wavelengths (if the fiber's thickness is just a little more than the wavelength it can also help contain the signal more efficiently) and therefore eventually much faster bit-rates and much more wavelengths, so that for example a fiber with the size of a few hundred nanometers or less will be especially suitable for carrying for example extreme UV (less than 100 nanometers) instead of visible light, and a fiber with the size of just a few dozen nanometers or even a few nanometers will be especially suitable for carrying X-ray radiation (less than 1 nanometer). Also, in addition to or apart from using the holey fibers for this, other materials instead of silica (glass) might be used for this that are better suited for such frequencies, such as for example special kinds of artificially made saphires, etc. Preferably, larger nanofibers (for example those a few hundreds of nanometers thick) will be produced by conventional methods, and smaller ones (especially nanofibers with the size of just a few nanometers) will be preferably constructed by nanotechnology methods, which means "from the bottom up" by adding molecules, instead of starting with larger structures and using relatively crude methods to press or corrode them into the required form. This has been included already in the PCT of 2001, upon which the present application is based as a CIP of Ser. No. 10/307,422. And indeed, in 2003, scientists have succeeded in creating optical nanofibers with a relatively good regularity and a thickness of around 50 nanometers, by first using a normal drawing process under a flame to create a 1 micron optic fiber, and then they used a $2^{nd}$ stage in which they used a tapered sapphire fiber with a tip diameter of about 80 nano to absorb the thermal energy from the flame and transfer it to the drawn fiber. Since they used a light frequency with a wavelength larger than the diameter, most of the light traveled outside the fiber in a sleeve of an evanescent wave (so that the air acted like the cladding), however due to insufficient regularity of the surface and/or surface contamination the losses were vary large: at 633 nm the optical loss with a 190 nm fiber was about 1.7 dB per 0.1 mm—which is very high. However with a fiber diameter of 450 nm and a wavelength of 633 nm and similarly with an optic fiber of 1000 nm and a wavelength of 1550 nm only 20% of the light traveled outside and the losses were down to 0.1 DB per 0.1 mm, which is still very high compared to the loss of normal state of the art optic fibers, which is about 0.15 dB/Kilometer. (Nature, Vol. 426, December 2003). So in order to improve the regularity of nano-fibers, and especially for example when drawing holey nano-fibers (which are more complex since they are typically created by joining together a group of hollow fibers and then drawing them together) and/or for example for more precision even in drawing for example normal holey fibers, one possible variation is to use for example infra red lasers to improve the even distribution of the heat, for example instead of or in addition so such a tapered intermediate device. This can be done for example by using laser frequencies in which the conductance of the fibers is much more poor than their optimum. Another possible variation is to use for example automatic sensors to sense the irregularities together for example with means of automatic vapor deposition to correct them and/or for example other automatic means to correct them preferably locally. According to another article—http://www.opticsexpress.org/view_file.cfm? doc=%24)%2C3) IP%20%20%0A&id=%25 (%2C'%2BJ%2CX%20%0A, the best holey fibers currently have an attenuation of around 1.2 dB/Km, which is caused by surface roughness caused by SWC (Surface Capillary Waves), and they show that with a few additional improvements the losses will probably soon go down to the level of ordinary fibers or even lower. However, according to http://www.lightreading.com/document.asp?doc_id=21449&print=true, the current state of the art in making holey fibers is Km-lengths of polymer-coated fiber with losses as low as 0.5 dB/km at 1550 nm for index-guiding fiber [BlazePhotonics Ltd., ECOC 2002]. This is still more than 3 times the losses of ordinary fibers, but since Holey fibers can carry signals which are 2 orders of magnitude stronger than what can be sent in ordinary fibers (since nonlinear effects in the core are negligible in the hollow core), preferably in holey fibers the signals are broadcast with sufficiently strong power so that little or no erbium amplifiers are needed. For example, if normally about 70 amplifier stations would be needed between Israel and the US, so for example when the losses of holey fibers go down to near the level of the losses of the current state of the art normal fibers (around 0.15 dB/Km) or lower, then for example broadcasting signals which are initially for example around a 100 times stronger means that the distance to the first amplifier can be for example a 100 times longer, thus for example no amplifiers will be needed at all for example between Israel and the US. However, an increase of 100 times the power increases the DB only 20 times so probably 5 amplifier stations will still be needed in this example, but this is still much better then for example 70 amplifier stations. In addition, since holey fibers can transmit a huge number of lambdas and/or since a huge number of fibers can be used for example by the methods described in the present application, another possible variation is that various, preferably multiple, forms of redundancy are used, for example by broadcasting the same data stream in more than one channel (for example as multiple lambdas in the same optic fiber and/or in more than 1 fiber), and/or for example by adding more error correction data, so that even if the signals arrive weaker they can still be reconstructed with the help of the redundancy data.

These nanotechnologies will preferably also enable us to create small nano-lasers for creating the wavelengths and for the pumps to power the amplifiers or at least make the interface for reaching each individual fiber at the two ends of the cable and at the amplifiers. Another possible variation is to use for example long Bucky Tubes or similar structures, in which extreme UV of even higher frequencies of light are used, and preferably the small holes in the Bucky (or similar) structures act as the optical band gap thus reflecting the light back into the tunnel.

Another mid-way variation, is to use for example fibers the size of 1-5 micron, and then we can have many more fibers in the same space than for example 10 micron fibers. However, for example with 1 micron we cannot use anymore the wavelengths around 1500 nanometers (=1.5 micron), since that would exceed the size of the fiber, so instead preferably the system uses for example visible light at the range of 500 nanometers and below, or even UV, and Raman amplifiers are used instead of Erbium.

Another possible variation is to use (preferably together with DWDM), instead of many small fibers (or within many fibers by using for example many multi-core holey fibers), a large number of thin optical wave-guides within a medium that supports them. For example, submicron to nanometer range microstructures of wave-guides can be created in Lithium Niobate (LiNbO3) or other polymers, so instead of a large number of thin fibers, we can use a medium like this, which prevents the huge number of signals from mixing up by confining each channel to its own wave-guide. So this technology, which is currently used in optical switches, might be used also for broadband communications. Another possible variation is using a large number of miniature long holograms that create a large number of small separate channels. Another possible variation is to use some material, preferably a flexible light-reflective polymer or for example holey optic fibers (for example made of glass or of plastic), so that preferably these fibers or flexible polymers trap light in multiple hollow cores, each preferably surrounded by smaller tunnels that create a light band-gap around each such core (which enables much better reflection), so that there is preferably one or more cores or even a very large number of cores, made of minute micro-tubes or nano-tubes of air or vacuum, so that each creates a separate channel for signals to travel through. Preferably, if this is done with holey fibers then there are many such fibers, each preferably with one or more or multiple cores, and then many fibers are preferably stacked together for example in multi-fiber flat jackets that move freely in the pipes, as described throughout this invention. Another possible variation is to preferably make each such fiber itself flatter so that there are for example one or a few hollow cores height-wise and much more hollow cores width-wise. In this case, again, many such fibers are preferably stacked together in multi-fiber flats jackets of any of the types described in this invention, or for example single flat multi-core fibers can each fill-up an entire such flat jacket, or a number of them fill up such a jacket. If one or more flexible polymers are used instead of glass, then preferably they are also wider than high, and for example many such flat flexible multi-hollow-core polymers can be stacked upon each other like the flat multi-fiber jackets, or in combination with such jackets. This has also many other advantages: 1. There are much less distortions or attenuations through the air, so much less amplifiers and no repeaters will be needed even for longer distances, and also stronger lasers can be used with less problems of distortions. 2. For the above reason, more wavelengths can be used with closer spacing between them. 3. There is a much wider available range of useable frequencies (since for example this solves the problem of Raman scattering in optic fibers in smaller wavelengths), so a much larger range of wavelengths can be used. 4. For the above reasons also higher bit rates can probably be used, especially with the shorter wavelengths. Another possible variation is to fill the hollow tubes with some other gases instead of normal air, that are even more optimal for light transfer, and/or use lower air pressure or vacuum, preferably combined with similar lower air pressure or vacuum in the surrounding solid cable. In these cases where hollow cores are used, then when amplifiers are used preferably one or more powerful laser pumps are used to amplify the signals of many cores in free space, for example by shining the laser pumps over large groups of fibers at appropriate angles (if they are transparent fibers, such as for example holey glass fibers) or for example in the area of the amplifiers the signals pass through one or more preferably multi-core glass boxes for example with Erbium doping, preferably with the aid of delta-connectors that spread them on a larger area. Another possible variation is for example to spread Erebium particles in the air, preferably densely in a small area, or for example in the amplifier areas the Erbium particles are within the fibers. Another possible variation is for example that in the amplifier stations the fibers become non-hollow and preferably erbium-doped (for example by soldering together hollow and non-hollow glass pipes during the production process, before starting to stretch them, or, in case of multi-hole flexible polymers, for example by inserting non-hollow optic glass fibers in the holes in these areas, or by using preferably delta-like connectors, such as for example those described in FIGS. 11*a-c*), and/or any of the other solutions for the amplifiers described in this invention are used, such as for example in those described in FIGS. 4-8. Preferably, in the area of the amplifiers, delta-like connectors are used, such as for example those described in FIGS. 11*a-c*, in order to create in that area whatever configuration is desired. Of course, it is also possible to use multiple fibers, each with a single hollow core, for these other advantages, but adding more cores to each fiber is also preferable. In the other direction—Another possible variation is to use for example multiple optic fibers each with multiple non-hollow cores, and in this case preferably also each fibers is wider than high. Of course these variations can be used in combinations with other features or variations described in this invention. These solutions are also another way of solving the problems of friction and possible damage that exist when using a large number of fibers, and they also make it easier to identify the channels at both ends of the cable since each channel can be at an exact position relative to a certain fixed reference point in the polymer. These solutions can also be used either as in a round cable formation, or flat cable, or something in between. Other variations are also possible.

Another possible variation is using for example, instead or in addition, multi-polarizations multiplexing, which means using different polarizations for the channels so that more channels can exist in parallel. In other words, for example, the 80 or 100 wavelengths are multiplied at least a number of times, so that within each group all the wavelengths have the same polarization, and between the groups a different polarization is used for each group. However, this solution requires polarization-retaining fibers, which are more expensive, and might suffer more from dispersion problems, so it can be used either for much smaller distances or with some means of correcting the dispersion. For example, if 16 or more different polarizations are used, preferably every once in a while appropriate consecutive polarization filters are used on the way, so that only light at one of the allowed polarization angles is allowed to pass through. This might decrease the strength of the signal, so more amplifiers are needed. However, due to the fact that this embodiment is more problematic, the more preferred embodiments are significantly increasing the number of fibers per cable.

IMPORTANT CLARIFICATION AND GLOSSARY

Throughout the patent when variations or various solutions are mentioned, it is also possible to use various combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable sub-combination. All these drawings are just exemplary. They should not be interpreted as literal positioning, shapes, angles, or sizes of the various elements. When used throughout the text of this patent, including the claims, "computer" means either computer or computers. Also, although this invention was described in various places in relation to Erbium or Raman amplifiers, this is just an example, and similar methods can be used for other types of amplifiers that may be used in the future. When used throughout the text of this patent, including the claims, "electrical power line" means either line or lines. Eventhough the invention usually refers to the cable as a metal pipe, this is just an example and the pipe can be made also of other materials, such as for example strong plastic, carbon tubes, or various alloys. Optic fibers, as used throughout the description, including the claims, can mean either normal optic fibers, such as for example made of glass, plastic, ZBLAN, various saphires or crystals, or various kinds of holey fibers, or any combinations thereof, and can be either multi-core or single-core fibers, including for example non-transparent flexible polymers that contain multiple holey cores. As is clear from the drawings, it should be understood that throughout the specification, including the claims, the pipe can mean any sufficiently rigid hollow element which preferably serves as the walls of the optic fiber cable, even if it is not shaped like a typical pipe, so whenever the word pipe appears it can also mean the walls of the optic fiber cable.

DETAILED DESCRIPTION OF THE PREFERRED EMBODIMENTS

All of the descriptions in this and other sections are intended to be illustrative examples and not limiting.

Figure 1:
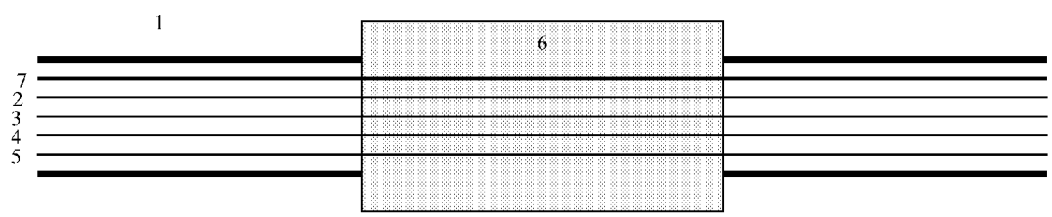
FIG. 1 is a schematic illustration of typical elements in a standard prior art long-distance submarine or overland optic fiber cable.

Referring to FIG. 1, we show typical elements in a standard state of the art submarine or overland long-distance optic fiber cable. The cable (1) is typically composed of a strong metal shield with a typical external diameter of 2.5-5 centimeters for submarine cables and typically considerably less for overland cables, and contains a small number of very thin fiber pairs (typically around 8-12 micron each, marked 2-5), and an electrical cable or cables (7) for powering the amplifiers (6) along the way. The amplifier stations (6) are typically about 10 meters long, and at their position the pipe is typically thicker than normal in order to accommodate the laser pumps and their interface, and they are typically at a distance of about 80-120 Kilometers between each other.

Figure 2:
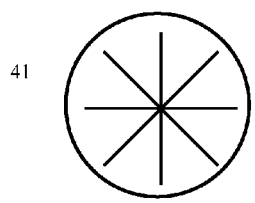
FIG. 2 is a schematic illustration of an example of using multi-polarization multiplexing in each fiber (preferably in addition to DWDM).

Referring to FIG. 2, we show an example of using 4 different polarizations in a single fiber (41), as viewed in a cross-section looking straight into the fiber. Each straight line represents a plane in which the light waves of that polarization can travel. As can be easily seen, using multiple polarizations at the same time allows the beam to take advantage of much more space in the fiber, compared to using just one polarization. Each of the 4 exemplary polarized beams can contain multiple wavelengths. Of course, a larger number of polarizations can be used.

Figure 3:
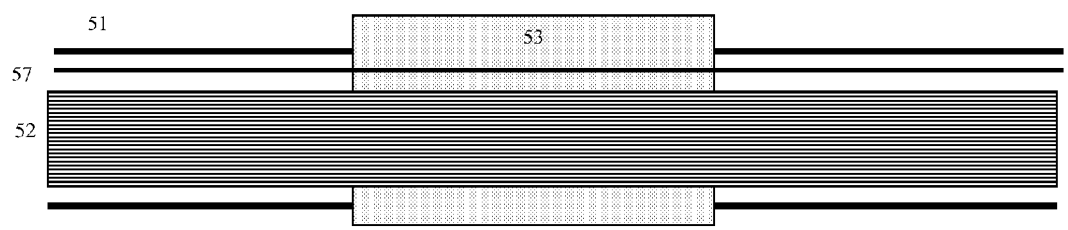
FIG. 3 is a schematic illustration of an example of using an extremely large number of optic fibers in each cable (submarine or overland).

Referring to FIG. 3, we show a system similar to the system shown in FIG. 1, with the optic fibers (52) and the electrical power line (57), except that much more fibers (52) are now being used in the cable (51) and the amplifiers (53) have to deal with a much larger number of fibers (52) simultaneously.

Figure 4:
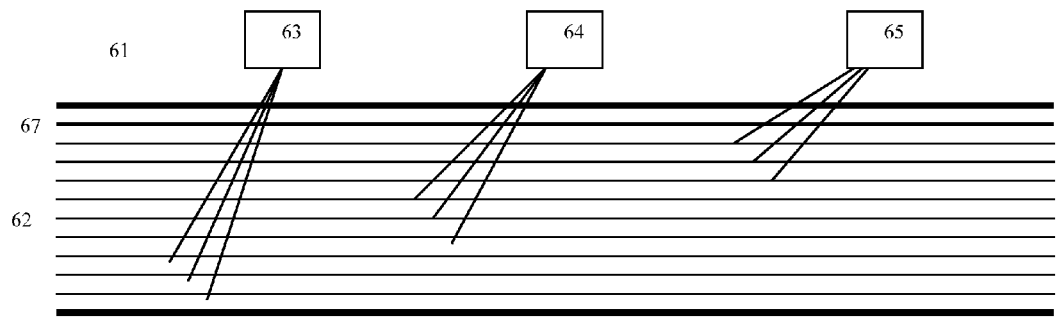
FIG. 4 is an illustration of a preferable way of using many small laser pumps for amplifying small groups of fibers or individual fibers.

Referring to FIG. 4, we show an illustration of a preferable way of using many small laser pumps (for the sake of clarity, we show just 3 such laser pumps, marked 63-65) for amplifying small groups of fibers (62) within the cable (61), so that each pump for example handles just 3 fibers preferably through appropriate splitter interface. The laser pumps are powered by the electrical power line (or lines) (67). These electrical power lines can also be actually inner isolated layers in the pipe itself. Of course, this is just an illustration of one example, and the number of fibers supported by each laser pump can change (For example 1 or more fibers per pump). Also, the cable contains of course much more fibers than the example shows. Eventhough the illustration does not show it, preferably the pipe is actually much larger at the area of the amplifier, in order to accommodate the laser pumps and their interfaces. Actually, since these small laser pumps are typically semiconductor laser diodes, they can also be used one per each fiber. Another possible variation is to put for example thousands of such diodes within one or more chips, and have a preferably very large number of fibers go through each chip so that preferably each fiber is interfaced with one mini laser pump. Preferably, the fibers are coupled to the chip by using flat multi-fiber jackets and connectors, as described in FIGS. 10a-b & 11a-c. It is also possible to use these small laser pumps with the fibers for example lying side by side (like in FIG. 6 below). Another possible variation is to use instead for example SOA (Semiconductor Optical amplifiers), which are electrically pumped instead of optically pumped, which means that making a VLSI multi-fibers chip is easier and energy efficiency can be higher. Preferably this is done without separating the wavelengths. Of course, various combinations of these and other variations can also be used.

Figure 5:
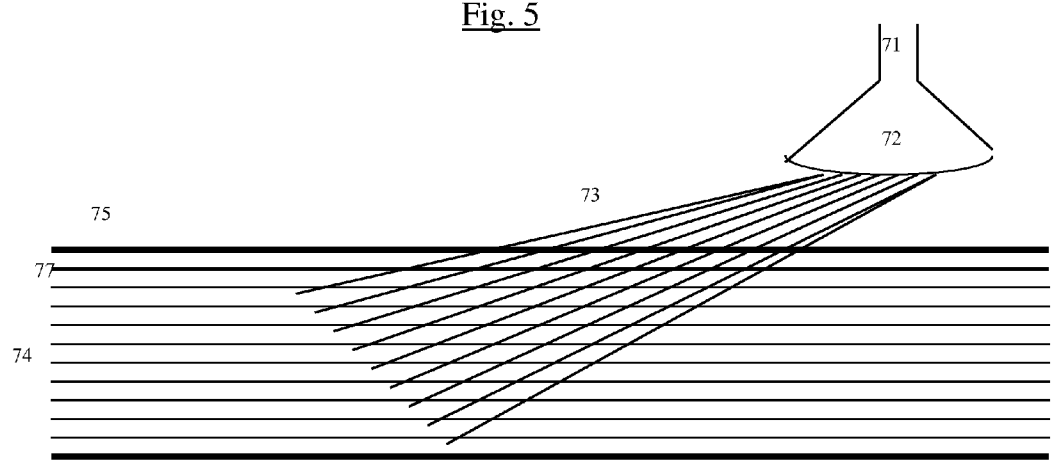
FIG. 5 is an illustration of a preferable way of using one or more one-to-many optical splitter in the amplifier for conveying the energy from the laser pump to the individual fibers.

Referring to FIG. 5, we show an illustration of a preferable way of using one-to-many optical splitters in the amplifier for conveying the energy from one or more powerful laser pumps (71) to the individual fibers (74) that run through the cable (75). In each amplifier one or more powerful laser pumps (71) is interfaced to the fibers that it empowers preferably by means of secondary fibers (73), each coupled at one end to one or more of the fibers that are (74) empowered by said laser pump and coupled at the other end preferably to the surface of a magnifying optical device (72) that widens the powerful laser beam (71) from the laser pump to the size of the surface needed for connecting all said secondary fibers (73) to the magnifying device surface (72). This magnification makes the laser light spread to a larger area, while still maintaining its coherent properties. Preferably, some filters are also added in order to prevent possible reflections and therefore some cross-talk of signal echoes between the individual fibers (74). Eventhough the illustration does not show it, preferably the pipe is actually much larger at the area of the amplifier, in order to accommodate the laser pump (or pumps) and its interface. If more than one powerful laser pump is used, then preferably each pump handles a large sub-group of the fibers. The coupling between each of the secondary fibers (73) to its appropriate data carrying fiber (74) is preferably done by a wavelength-selective optical coupler or by merging with the fiber at an appropriate angle. Another possible variation of this is to use instead of the secondary fibers (73), waveguides or holograms. Also, since one of the possible embodiments is using a large number of miniature waveguide instead of many fibers, they also can be connected to the laser beam with either secondary optic fibers (73) or secondary wave-guides. Of course, various additional variations or combinations can also be made. The electrical power lines for the laser pump (77) are for example either electrical wires, or an inner isolated layer or layers in the pipe itself.

Figure 6:
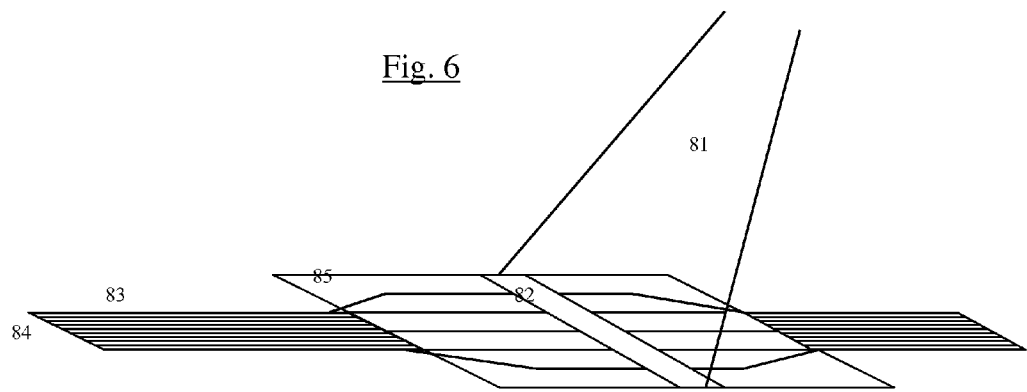
FIG. 6 is an illustration of a preferable way of using one or more optical splitter in the amplifier for conveying the energy from the laser pump to individual fibers spread flatly side by side.

Referring to FIG. 6, we show an illustration of a preferable way of using one or more large optical splitters in the amplifier for conveying the energy from one or more powerful laser pumps (81) to individual fibers (84) spread preferably flatly side by side. In the area of the amplifier, the cable's pipe (83) preferably extends to contain at least one wide flat surface (85), and the fibers (84) at the area of the amplifier are spread on this flat surface (85) side by side and coupled for example to a long optical splitter (82). There can be a number of variations in the way this splitter is made: For example, preferably a long semi-transparent strip of glass for example at a 45 degree angle is used, through which all the fibers pass, and the laser beam enters the glass from above, for example at a 90 degree angle to the fibers, and is projected from this glass directly into the length of the fibers. A large range of other angles could also be used. Another possible variation is that the fibers themselves in this area have a slight curve at their top forming the shape of the required angle. Another possible variation is that preferably the fibers in this section are coupled to an elongated strip of glass that covers them at the top, so that the top of the glass has a flat surface that faces the laser beam, and the bottom of the glass has a wavy surface that complements exactly the upper curves of the fibers, in order to make the absorption of the beam from the laser light more efficient. Preferably, this glass piece is separate per each fiber, so that it's actually more like each fiber is covered with one glass tooth with a flat top and a concave bottom, and the flat tops of these teeth touch each other side by side. Preferably, in this structure the "teeth" are glued to each other in order to make the entire structure more stable. However, in this variation preferably the laser beam does not hit the glass from straight up but at a certain angle, so that the light does not bounce back from the fibers. This variation is shown in more detail in FIG. 6*a*. These "teeth" can be made at a large range of heights, and in the extreme case can even touch the magnifying optical device through which the laser beam (81) passes, so as to conduct the beam directly from the laser even without any air gap on the way. Another possible variation of the last variation is a top glass that has the same flat surface above facing the laser beam, but its bottom is shaped like small upside-down triangle-shaped teeth so that each triangle creates a smaller beam that hits one fiber at a small point. In this variation, preferably the "teeth" are glued together to a covering glass plate, in order to make the structure more stable. This variation is shown in more detail in FIG. 6*b*. Another possible variation is that at the area of the amplifier the fibers themselves are shaped a little differently—for example instead of round wires they are taller and thinner and have a flat top. Other variations are also possible. Preferably, the laser beam (81) from the powerful laser pump or pumps enters the splitter (82) after passing through an optical device, such as for example a strip of magnifying glass, for making the powerful beam (81) elongated enough sideways in order to cover the entire width of the group of fibers (74) that are lying side by side. Preferably this magnification makes the laser light spread to a larger area, while still maintaining its coherent properties. Again, preferably, some filters are also added in order to prevent possible reflections and therefore some cross-talk of signal echoes between the individual fibers (84). Eventhough the illustration does not show it, preferably the pipe is actually much larger at the area of the amplifier, in order to accommodate the laser pump (or pumps) and its interface. Also, eventhough the illustration shows fewer fibers at the flat area compared to the rest of the pipe, the actual number is of course the same. In this solution, if more than one powerful laser pump is used, then preferably they are all illuminating approximately the same area, or a similar splitter is repeated a number of times at short intervals within the area of the amplifier and each powerful laser illuminates all the fibers at one splitter, so that their effect is incremental, or all the laser pumps are at the same splitter strip, but each laser beam is elongated enough to cover only part of the elongated splitter so that they work side by side. Eventhough the splitter is preferably made of glass, it might also be made of other materials and not necessarily glass. Other configurations than a flat surface are also possible, so that the fibers in the area of the amplifier can be arranged for example also side-by-side in a semi-circle or other shapes. Of course, various combinations of this and the other solutions can also be made. Of course, this solution is most natural in case of using multi-fiber flat jackets, for example by spreading them side by side at the amplification station or by using a separate pump for each jacket. Preferably the laser light is directed (by its positioning and/or by additional prisms) to enter the fibers at acceptable angles that do not cause it to escape through the cladding. Another possible variation is to use for example more than once such flat layer, for example on top of each other, with certain distances between them, and for example the laser sources between them. Of course at the area of amplification the fibers are preferably stripped off the jacket. Of course various combinations of the above and other variations can also be used.

Figure 6A:
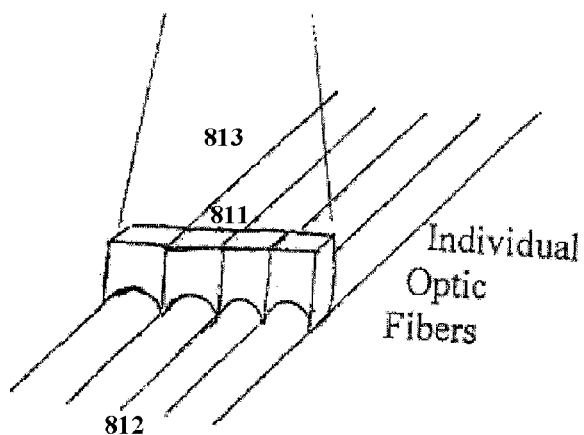
FIGS. 6*a* and 6*b* are 3-dimensional illustrative drawings of two preferable ways in which the splitter of FIG. 6 interfaces with the individual fibers.

Referring to FIG. 6*a*, we show a 3-dimensional illustrative drawing of a preferable way in which the small glass "teeth" (811) are coupled to the fibers (812) and face the laser pump beam (813) in the configuration that was described in FIG. 6.

Figure 6B:
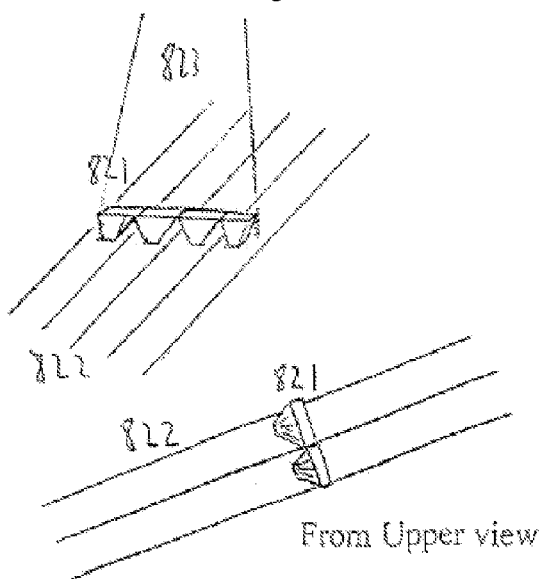

Referring to FIG. 6*b*, we show a 3-dimensional illustrative drawing of another preferable way in which the small glass "teeth" (821) are coupled to the fibers (822) and face the laser pump beam (823) in the configuration that was described in FIG. 6.

Figure 7:
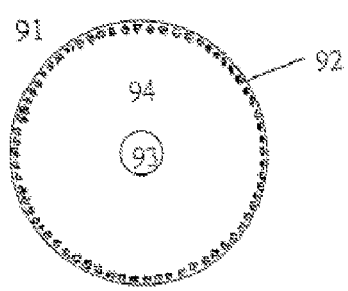
FIG. 7 is an illustration of a preferable way of using optical means in the amplifier for conveying the energy from one or more laser pumps to individual fibers spread side by side on the internal surface of the pipe.

Referring to FIG. 7, we show an illustration of a preferable way of using optical means in the amplifiers area for conveying the energy from one or more powerful laser pumps (93) to individual fibers (92) spread side by side on the internal surface of the cable's pipe (91). We show a cross-section of looking straight into the cable. In the area of the amplifier, the pipe (91) is preferably enlarged, and the fibers (92) are preferably spread side by side on the internal surface for example by either coupling them to the internal surface of the pipe, or coupling them to the external surface of an internal transparent medium (94), such as for example the same refractive glass from which the exterior of each fiber is made (as compared to its core). Preferably the beam from the powerful laser (93) comes from the center of the pipe after passing through an optical device (such as for example a conical prism) that makes the beam spread all around the inner circle and illuminate the fibers (92) at the same time. Preferably, the fibers are covered with an inner transparent ring between them and the laser beam, similar to the way that the glass "teeth" work in solution number 8. This ring can be made at a large range of sizes, and in the extreme case can even touch the magnifying optical device through which the laser beam (93) passes, so as to conduct the beam directly from the laser even without any air gap on the way. Preferably this magnification makes the laser light spread to a larger area, while still maintaining its coherent properties. Preferably, some filters are also added in order to prevent possible reflections and therefore some cross-talk of signal echoes between the individual fibers (92). In this solution, if more than one powerful laser pump is used, then preferably they are all illuminating approximately the same area, or they are positioned at short intervals with similar interfaces within the area of the amplifier so that their effect is incremental, or all the laser pumps are at the same intersection point with the fibers, but each laser pump is illuminating only a part of the 360 angle, so that they complement each other. Eventhough the splitter is preferably made of glass, it might also be made of other materials and not necessarily glass. Of course, various combinations of this and other solutions can also be used. Preferably the laser light is directed (by its positioning and/or by additional prisms) to enter the fibers at acceptable angles that do not cause it to escape through the cladding.

Figure 8:
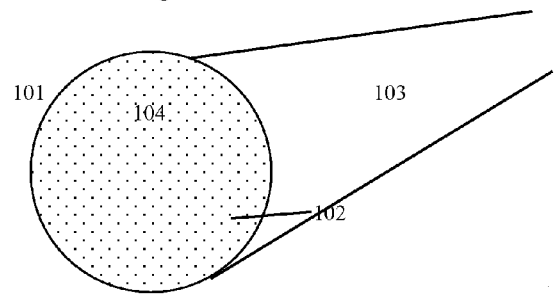
FIG. 8 is an illustration of a preferable way of using optical means in the amplifier for conveying the energy from one or more laser pumps to individual fibers spread more or less evenly in a transparent solid or liquid in the middle of the pipe in the area of the amplifiers.
Figure 9A:
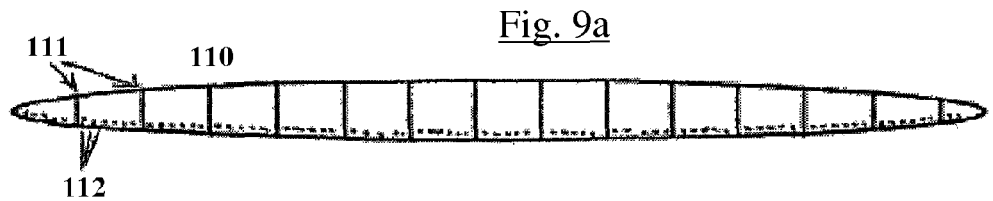
FIGS. 9*a*-9*d* show (through cross-sections) a few examples of some possible structures of a flat cable.
Figure 9B:
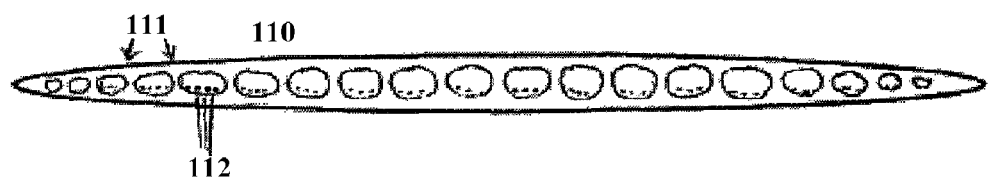
Figure 9C:
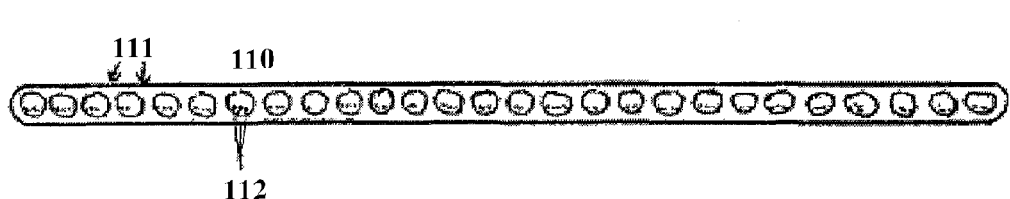
Figure 9D:
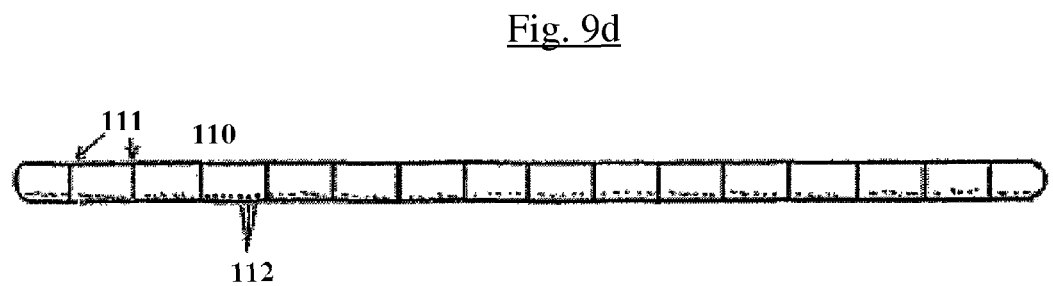

Referring to FIG. 8, we show a schematic illustration of a preferable way of using optical means in the amplifier for conveying the energy from one or more laser pumps (103) to individual fibers (102), spread preferably more or less evenly in a transparent solid (104) in the middle of the pipe, preferably made of the same refractive glass from which the exterior of each fiber is made (as compared to its core), or for example in a transparent fluid (104) preferably with a specific weight close to that of glass and a refractive index close to that of glass, so that the fibers can freely float there. (Another possible variation is to add electrostatic charge to the fibers in this area so that they spread away from each other). This is somewhat similar to the configuration of FIG. 7, except that the fibers (102) are not spread side by side at the inner surface of the pipe (10). The beam from the powerful laser (103) preferably passes through an optical device (such as for example a conical prism) that makes the beam spread all around the inner space of the cable in a small section of the area of the amplifier and illuminate all the fibers at the same time. Preferably, the inner surface of the pipe in the area of the amplifier is itself a mirror, so that it helps reflect back more light from the laser pump towards the fibers. Preferably, some filters are also added in order to prevent possible reflections and therefore some cross-talk of signal echoes between the individual fibers (102). In this solution, if more than one powerful laser pump is used, then preferably they are all illuminating approximately the same area, or they are positioned at short intervals within the area of the amplifier so that their effect is incremental, or all the laser pumps are at the same intersection point with the fibers, but each laser pump is illuminating only a part of the 360 angle, so that they complement each other. Of course, various additional variations of this can be made. Preferably, the fibers at the area of the amplifier are shaped a little differently, so that instead of the round glass cladding they have flat planes, for example hexagonal, octagonal, or other numbers of planes, so that the laser beam hitting them from various angles can still enter them more easily. (In this case, the inner core of the fiber can either remain round or also be made with flat planes fitting the glass cladding, however that would be more difficult to accomplish). Also, if mirrors are used on the inner side of the pipe in this area, then preferably they are a little tilted preferably in the length direction in order to increase the chance of the reflection of the laser pump beam hitting the fibers at angles other than 90 degrees. Another possible variation, is that on each of these planes there is also some additional tilted glass surface, so, for example, even light coming at 90 degrees to the fiber will still hit the plane at an angle different from 90 degrees. In either case, preferably, these planes are also covered with a thin layer of semi-transparent one-directional glass, so that it allows only the laser light to go in but no light signals can be reflected back out of the fibers. Preferably the laser light is directed (by its positioning and/or by additional prisms) to enter the fibers at acceptable angles that do not cause it to escape through the cladding. Of course various combinations of the above and other variations can also be used.

Referring to FIGS. 9*a*-9*d*, we show (through cross-sections) a few examples of some possible preferable structures of a flat cable (110). The "walls" (111) support the flat structure against being squashed for example by the strong pressures in submarine cables, and the fibers (112) reside in the cells, in a relatively flat layout. Many sizes of the cells and many different quantities of fibers per cell can be used. The fibers can be for example in a single layer, or more than one layer at the bottom of the cell. This way the fibers can easily move up and down in their cells in response to different stresses for example when the cable is curved around the ship's wheel compared to when it's flat at the bottom. Of course, many variations and combinations of this principle are possible. At the most extreme case miniatures cells might be used so each cell contains only one fiber, however, such a structure might be difficult to construct and not efficient.

Figure 10:
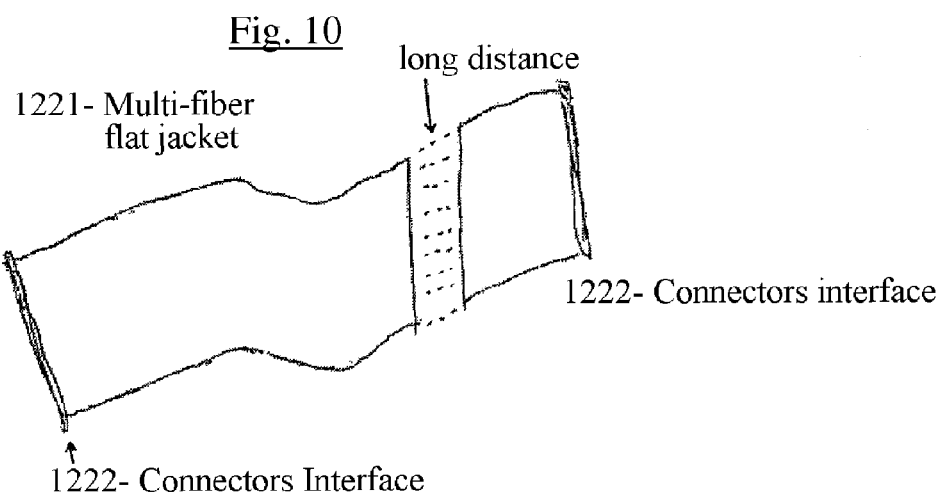
FIG. 10 shows a 3-dimensional illustration of a preferable multi-fiber flat jacket.

Referring to FIG. 10, we show a 3-dimensional illustration of a multi-fiber, preferably flexible, flat jacket (1221). The jacket is preferably made of a strong, thin, flexible, low friction plastic or nylon or other polymer. As explained in the descriptions of FIGS. 10*a-b*, the jacket can either allow free movement of the fibers in their "mini-cells" in all directions, or only in 1 direction (preferably the direction of the thickness of the jacket), or almost no movement at all (in which case the jacket is preferably just a little thicker than the fibers themselves), and can contain either just 1 fiber per cell or more than 1 fiber per cell. Preferably, at both ends of the long distance cable, the jacket has modular connectors or at least some other convenient modular pre-connector interface. The jacket can contain for example just one layer of fibers, or more than 1 layer. For example a 15 micron thick and 1.5 centimeters wide flat jacket can contain 1,000 10-micron optical fibers.

Figure 10A:
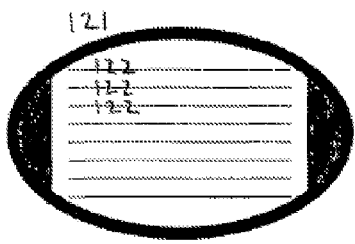
FIGS. 10*a-c* show a few examples of preferable configurations of the pipes that can be conveniently used with multi-fiber flat jackets.
Figure 10A:
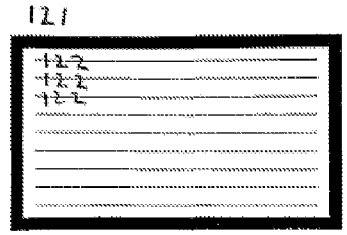
Figure 10B:
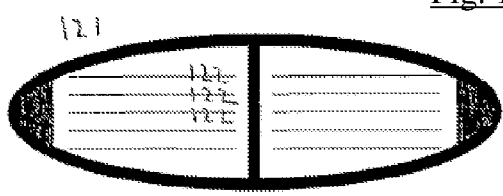
Figure 10B:

Referring to FIG. 10*a-b* & 10*e-f*, we show a number of examples of some preferable configurations in which a number of flat multi-fiber, preferably flexible, jackets (122) can be stacked upon each other within a preferably somewhat flattened pipe (121). This makes sure that the pipe will only bend in the desired direction so that the movement of the fibers up and down within the flat jackets and/or the movement of the jackets themselves up and down will compensate for the stress causes by the bending of the pipe. So, for example, if the size of each fiber is 10 micron and we put for example a spacing of 5 micron between them, we can build for example a flexible flat plastic jacket (122) that has a width of 1.5 centimeters and a thickness of for example 0.1 millimeters (100 micron) and contains 1,000 fibers, or for example a similar flat plastic jacket that contains 2,000 fibers and has a width of 3 centimeters. In this example each individual fiber can preferably move freely within its 100 micron space up and down to compensate for stress caused by bends in the metal pipe. However, for reaching for example 20,000 fibers (10,000 pairs) the variation of 20 flat jackets of 1.5 cm is more convenient than 10 flat jackets of 3 cm, because they fit better in a 2-cell pipe, which is structurally stronger than a 1-cell pipe. Preferably, the metal pipe in this example is either a partially flat pipe with an inner width of at a little more than 1.5 centimeters and we put the exemplary 20 flat jackets in a stack on top of each other, or the metal pipe is even flatter and has for example two cells with a strengthening wall between them, and we put for example 10 jackets on top of each other in each of the two cells. So if for example the inner height of the cable is 0.7 cm and the thickness of each flat jacket is 0.1 mm, it is still 70 times larger than the flat jacket, and the jackets can freely move up and down to compensate for stress caused by bends in the metal pipe. However, if the free movement of the fibers within the flat jacket is enough for compensating for bends in the pipe, we don't need the additional free movement of the jackets up and down and so can stack more such jackets together—for example 70 times more jackets and therefore 70 times more fibers. On the other hand, we can go also to the other direction and make the jacket extremely thin—for example about 15 micron thick, so that the 10-micron fibers can't almost move at all, but put more such flat jackets in the pipe and rely more on the free movement of the jackets in the pipe. However, even in this version preferably there is still at least some small gap between the fibers and the jacket in case the thermal expansion coefficient of the jacket is not exactly the same as that of the glass. Also, in all the variations of the jacket, the jacket is preferably opaque to light and preferably black or at least with dark color (including between the cells), in order to further decrease the chance of cross-talk between close fibers. Theoretically this is even better, because at the other extreme each fiber can move only 0.1 mm up or down in our example in response to stress caused by bending of the pipe, and in this extreme for example a 100 flat jackets, with a thickness of for example 15 micron each, occupy together about 1.5 mm and therefore can still move freely up or down almost 85% of a centimeter in a pipe of 1 cm internal height. Therefore, another preferable variation of this is to use a multi-layer flat jacket that has for example a 100 layers (and is preferably thicker at the two most external layers for better protection) or simply, for easier construction, for example a 100 flat jackets of the type described above are stacked together and wrapped by some slightly thicker additional protective material. This is some kind of hybrid between flat jackets and the multi-layer structure described in FIG. 10*d*. However, except for increased strength, there is no need to actually wrap the exemplary 100 layers together, and it might be even more flexible if each can preferably move freely up or down exactly to its most convenient position with each bend. Due to the above described considerations, this variation of extra-thin flat jackets is very preferable. By the way, the above calculations show that even 100,000 and even much more 10-micron fibers can easily and safely be stacked together in this method without exceeding the current typical total size of the pipes (except for making the pipe a little flatter and wider and preferably with more than 1 cell, with inner supporting walls between them). And if we go down in another variation for example to a size of 1 micron per fiber (and use a shorter wavelength—For example if the inner core of the 1-micron fiber is 0.7 micron in diameter, then we can use for example wavelengths starting at 400 nanometers and going downwards), then we can use a similar method to stack even millions of fibers in the same size of pipe. However, due to cladding thickness problems, such a fiber would preferably have for example a core of 200 nano or less and carry for example wavelengths of 40 nano or less. So for example, with 1-micron fibers a flat jacket of 1.5 cm width can contain 10,000 fibers, and the jacket can be for example 10 times thinner, and we can stack more jackets on top of each other. However, this might make the jacket too weak, so another possible variation is to not reduce the thickness of the jacket below a certain limit. Also, reducing the fiber's thickness to less than a few microns can be problematic because in shorter wavelengths there are more losses, mainly due to Rayleigh scattering, although there are optical fibers which can carry for example signals around 850 Nanometers with losses as low as 3 dB per Kilometer, and good fibers today come without the Hydrogen Oxide impurity that caused problems around the 1380 nanometers area. There are a few solutions to this: 1. Go down to only a few microns, which means that the lower loss wavelengths of about 1300-1600 can still be used, but still, for example, with fibers of 5 micron, 4 times more fibers can be used in the same space. 2, Use thinner fibers with signals for example around the 850 nanometer area. 3. Since the main cause of Rayleigh scattering is inhomogenities caused by fluctuations of glass density and compositions, producing more homogenous fibers will probably reduce this scattering (this may be done for example by producing fibers in space or by planning the design of the glass density in advance to compensate for the distortion caused by gravity during the manufacture process). 4. It might be possible to add some materials to the glass that will reduce its losses at these frequencies. for example ZBLAN fibers, which contain Fluoride, Zirconium, Barium, Lanthanum, Aluminum and Sodium, can work at ranges such as 1300-4000 nanometers with attenuations as low as 0.001 dB/Kilometer. Therefore, other variations or combinations with glass might help also in shorter wavelengths. 5. Use Holey fibers with smaller tunnels, so they can be used with shorter wavelengths wavelengths, and there is no problem of more attenuation or more distortions or more dispersion at the shorter wavelengths, since the light signals are traveling through free space. Another possible variation is using more than 1 fiber in each "mini-cell" of the jacket, so that for example 80 fibers with a diameter of 1 micron can fit in the same space of 1 fiber of 10 micron, and then the flat jacket of 1-micron fibers will be the same thickness as the flat jacket of 10-micron fibers, but a 1.5 cm wide jacket will carry 80,000 fibers. Preferably, in this case the fibers are each covered by a very thin layer of opaque, preferably dark, coating or color, with preferably the same thermal expansion coefficient as glass, to avoid cross-talk between the fibers, or immersed in an opaque dark liquid or powder (such as for example fine carbon dust). Another possible variation is using the multi-layer hybrid variation suggested above, so that for example we stack 100 ultra-thin flat jackets of 1-micron fiber together on top of each other and then add a somewhat thicker external envelope to make it stronger, and then altogether it still has a thickness similar to 1 flat jacket of 10-micron fibers. By stacking for example a 100 of these exemplary 80,000 fibers flat jackets on top of each other in the pipe, we get something the thickness 0f about 1.5 mm that can move freely up and down in the pipe to compensate for stress caused by bending, and contains 8 million 1-micron fibers. Of course, the number of cells in the metal pipe itself can be 1 or 2 or more, so various combinations of flat jackets and a flat metal pipe can also be made. Of course, the numbers here are just an example and various other numbers and sizes can be used. For simplicity, FIGS. 10a-b show only a few layers of the flat jacket, but, as explained, much more layers can be actually used. To look even at the lower bounds, for example even if the fibers have for example a 100 micron diameter (including cladding and coating, for example a 40 micron fiber with a coating thickness of 30 micron on each side), then for example in one of the configurations of FIG. 10a, for example with a typical submarine cable of a diameter of around 5 cm, for example each flat jacket of for example 3 cm width can contain for example 300 fibers and can have for example a thickness of even 150 micron (assuming for example a generous thickness of additional 25 microns for the thickness of the jacket's coating, and the coating can be for example a strong polymer—and this is for example compared to a typical thickness of 100 microns for a typical strip of paper, and of course it can be even much less, especially for example if the fibers are coated together in the jacket instead of being coated each individually before being coated together by the jacket, so that for example the whole thickness of the jacket could be for example 80-100 micron, thus providing a 20-30 micron thickness on each side to the for example 40 micron fibers, and if for example the coating of the jacket between each two fibers is around 10 micron, then the 3 cm jacket can carry for example 600 such fibers), then all that is needed to reach for example 10,000 fibers is for example 17-33 such flat jackets, and even at a thickness of for example 150 micron per jacket, the entire stack of 33 jacket would have together a thickness of only 5 mm, and of course with a smaller thickness, for example just 100 micron, the 33 stack would have together a thickness of about 3.3 mm, and the 17 stack would have a thickness of about 1.7 mm. Another possible variation is that for example between each two fibers in the flat jacket (or for example between every group of fibers) one or more additional strength member is added (such as for example a metal wire preferably with a diameter similar to that of the fibers), however if such strength fibers are added they are preferably made of a material with a similar thermal expansion coefficient to that of the fibers. Of course various combinations of the above and other variations can also be used.

As explained above, the flat jackets are preferably loose enough to be able to move and bend freely. Preferably they slightly bend for example with a wavy shape of curves, as shown in FIGS. 10e & 10f. Another possible variation, shown in FIGS. 10e-10f (which show a side view of the group of flat jackets), is that for example the jackets are stitched together and/or for example glued and/or otherwise coupled to each other in a way that preferably does not apply pressure to the optic fibers, preferably at certain intervals (for example every few dozen centimeters or more or for example every meter or more or every few meters or more or any other convenient interval), for example by wires or staples that go through the jackets at the stitch area (242), for example at the edges of the flat jackets where there are preferably no fibers and/or for example in one or more strip without fibers that runs for example lengthwise in the middle of the jackets (i.e. preferably through one or more holes), so that preferably the jackets won't slide against each other. Another possible variation is that for example these stitch points or some of them or for example other points of the grouped jackets (or of individual jackets independently) for example connect also with the pipe itself at certain intervals (243) (which means that this can be for example the internal wall of the outer pipe, or an elongated cell in which the fibers are, as explained elsewhere in his application, in case the cable contains more than one compartment lengthwise side by side, or for example the internal wall of some inner pipe or tube, or other enclosure which contains the fiber jackets) (Eventhough FIGS. 10e & 10f for clarity show the connection or coupling area as having some height, this is just for illustration and of course at the connection or coupling area the jackets can also for example touch for example the cable or pipe very closely, however unless the inner wall to which the jackets are coupled is rectangular or at least flat at the side to which the fibers are coupled, there is preferably at least an internal preferably flat protrusion to which the jackets are coupled, at least at the intervals of the coupling, for example like an internal fence or hedge or ramp). Preferably this coupling to the cable switches its direction each time, so that for example the even connections are to the bottom of the pipe and the odd connections are to the top or vice versa (Of course the top and bottom can become for example right and left if the cable is rotated, but logically it is the same), or at least once in a while. This has the advantage that the jackets don't slide lengthwise compared to the pipe for example when the pipe bends or becomes straight again, thus avoiding unnecessary friction, and avoiding for example fluctuations so that at certain areas there could be too much or too little length or slack of jackets at the area of the bend. Preferably each such "stitch" area is also coupled to the cable, preferably to the internal wall of the pipe or cable, and these stitches are preferably for example every meter or more or a few meters or more or other convenient interval (this means that preferably the intervals of coupling jackets to each other and/or of coupling them to the cable's or pipe's walls preferably are for example more or less constant or for example preferably in another variation they can change for example according to various considerations for example at different sections or in different patterns, so that for example they are sometimes smaller or sometimes larger or for example the intervals change in some pattern, or for example they are irregular). This coupling is preferably by connecting the "stitched" area for example by wires for example to some internal (preferably low and wide) protrusion on the pipe's inner wall, wherein said internal protrusion preferably has for example one or more holes in it for making the connection, and/or for example by gluing, and/or for example by any other known means of preferably easy clipping or screwing or hooking or coupling in a way that preferably connects to the side or sides of the jackets preferably without creating pressure on the jacket. Another possible variation is to use for example some flexible stitch or hook such as for example rubber or spring or for example somewhat loose wire (which preferably still goes through the jackets as explained above), which can for example allow some bouncing that can for example change the distance between the jackets and the inner wall to which they are coupled, but that is less preferable. A further advantage of this arrangement is that the coupling of the flat jackets to the cable at these intervals helps ensure that the flat jackets will not rotate out of orientation or move too much sideways in the cable (especially for example if it is with glue and/or for example staples or wires that go for example through both edges of the jackets, as explained above), and thus an additional advantage is that there can be larger flexibility in choosing the dimensions of the cell or cells in which the flat jackets move (of course this means that in the case of flat jackets if the coupling is for example to an inner pipe, preferably the inner pipe is also prevented from rotating relative to the external pipe, and as explained in other places in this application, in case of flat jackets preferably the cable can only or mainly bend in a limited direction or directions—corresponding with the orientation of the flat jackets). A single cell or for example two cells is more efficient than multiple cells, since less parts are needed and the space can be used most efficiently. This arrangement is much more efficient than for example the arrangement of Katurashima (U.S. Pat. No. 5,233,678) and similar arrangements which use multiple inner tubes twisted around a central strength member with a structure of optic fibers in each tube, because in the present arrangement much less elements are needed, the space can be used much more efficiently, and access to the fibers is much more easy (for example for maintenance or for identifying individual fibers). Another possible variation is to use instead for example some elongated rectangular clips for the stitch, but this is not recommended for optic fibers since the pressure could damage the fibers. Another possible variation is to use a similar stitching arrangement (or other form of coupling at intervals) for example in the variations of using for example one or more or a few or more or a few dozen or more (or any other convenient number) freely moving groups or bundles of preferably densely packed fibers, which is similar to the way that some copper wires are connected every once in a while to the cable in some phone cables with a ring that presses the wires, however a ring which presses copper wires is preferably not used to press optic fibers since optic fibers are much more sensitive to pressure, so preferably the stitch or other coupling is preferably done by wires or screws that go through one or more holes in the group jackets and/or for example by gluing the groups to each other and/or gluing preferably that area also to the pipe. Another possible variation is for example coupling individual groups separately to the cable or for example together with some of the others (for example if there are 50 groups or bundles altogether, then for example each 10, or any other convenient number, are coupled together). (In this variation all sets can be for example coupled to the cable in the same directions and/or for example also changing directions together, or for example each set is coupled in a different direction, so that they less interact with each other). This is more problematic and less organized and less efficient than the flat jackets solution, but it has the advantage that in these variations the cable can be allowed to bend freely in any direction. Another possible variation is to use the same principles of stitching or coupling at intervals for example with one or more multilayer structure of fibers (which can move for example freely or for example both the structures and the pipe can bend only in one direction), or with any other arrangement of optic fibers within the cable. (In other words, as explained above, the fiber jackets can be for example stitched together only at the areas of the coupling for example to an inner wall of the cable or for example an inner tube, or for example stitched to each other also between the intervals of said coupling for example in one or more other intervals as explained above, or for example they are coupled to each other all along the way as a multilayer structure, so that the multilayer structure as one unit is coupled at intervals to the cable or inner tube). As explained above, in the above variations preferably the waviness or bending of the fibers is preferably kept sufficiently small (preferably for example by using sufficiently large intervals between the points of coupling to each other and/or to the cable and/or by avoiding too much slack between the coupling points), so that the bending is preferably sufficiently or considerably below angles that could cause losses (but preferably the waviness or slack is sufficient for compensating for any bending which can occur in the cable or pipe for example while laying it or during operation), and preferably thinner fibers are used, such as for example of 40 microns or less including the cladding, which has many advantages as explained throughout the application, and also, as explained above, they have considerably lower bending loss than for example fibers of 80 micron or of 125 micron with the cladding. This is very different from prior art configurations also because, as explained above, according to the present invention preferably between said intervals the optic fibers can move more freely or substantially more freely relative to the cable compared to the points of coupling to the cable, and they typically move in a hollow enclosure (i.e. filled for example with air or gas or liquid), such as for example the inner cavity of the cable, an elongated cell (if there is more than one such cavity), or for example an inner tube within the cable (which is preferably also similarly coupled to the cable at least in intervals), and as is clear from the above explanation and from FIGS. 10e & 10f, this is preferably clearly asymmetric, so that at the areas of coupling to the cable (or cell or tube or pipe or other enclosure) the jackets are typically substantially more far from the opposite internal wall than from the internal wall that they are coupled to, which is what enables the more free movement between said intervals. In order to feel just how elegant and efficient and parsimonic this solution is, one can for example take an elongated cardboard tube of for example 20 centimeters or more in length for example with a few centimeters diameter (for example from typical rolls of kitchen paper towels) and then for example cut together 7 pieces of for example A4 paper in the elongated direction into long strips of for example 30 cm length with for example 2 or 2.5 cm width, which gives about 100 such strips (so that each such strip is more or less similar in thickness to a flat jacket that can contain for example even 400-2000 optic fibers or more or a similar large number, depending on the type of fibers used), and then insert said strips as a group in the tube and for example staple them together for example at least in one place to the inner wall of the tube, for example near one of the edges, and then play freely with bending the tube and seeing the behavior of the represented jackets. As such a model demonstrates, even for example a 100 such strips or jackets (which can represent for example 40,000-200,000 optic fibers!) occupy together in combined thickness for example at the area of the stapling just around 0.5 cm (5 mm), so they can still move quite freely in the tube, and for example stapling them at intervals for example with switching the direction of the coupling each time (for example every 50 cm or 1 meter or more) in a longer tube (for example made by connecting several such cardboard tubes longitudinally or for example by using a typical plastic pipe that can carry for example electric wires in buildings, with the desired diameter) and using longer strips preferably with sufficient but preferably not too much slack for the stripes between the intervals, enables them to move easily without stress even with considerable bending of the pipe. Clearly this will work the same for example with a metal optic fiber cable of for example 5 cm outer diameter and 3 cm inner diameter, which can preferably bend only in the desired direction, for example by any of the means described in this application, such as for example using two welded such pipes or for example using a pipe with an ellipse cross section and/or other form of strengthening which favor the desired bending direction. (Of course this can be demonstrated similarly for example with just 10 such strips, or for example any number of strips between 10 and 100, or even more strips). And since, as explained elsewhere is this application, the optic fibers themselves typically cost much less than the cable (for example a few cents or less or even much less per meter compared to for example a few dollars or even $20 per meter for the cable), and since as explained above in these solutions there are much less elements needed within the cable, and since the huge number of possible fibers that can be included can also compensate for example for even a large percent of faulty fibers, these solutions can enable at almost the same price of current typical prior art cables, to easily use for example even 1000 or more times more fibers than in the prior art solutions, since a typical prior art transatlantic optic fibers cable today usually does not carry more than for example 200 fibers. The above solution is much better than U.S. Pat. No. 6,687,437, in which a wavy form is created by simply pressing a multilayer group of jackets into the cable, since, as explained above, in the present application the jackets are preferably actually fixed to the cable at the desired intervals in a way that preferably substantially prevents lengthwise sliding of the jackets relative to the cable at the coupling points, i.e. preferably by mechanical means (for example stitching or hooking) and/or chemical means (for example glue can work mechanically and/or chemically) and not by mere pressure (of course if for example the stitching point allows for example slight sliding movement for example back and forth for example within a few millimeters or for example a few centimeters or less for example due to some flexibility of the stitch preferably this does not count as real sliding, but preferably the coupling point is fixed) and preferably enables controlling of the size of the intervals and the amount of slack or looseness of the jackets between them, whereas in U.S. Pat. No. 6,687,437 there is no such fixing and the wavy form is created by merely pressing the jackets into the pipe so in U.S. Pat. No. 6,687,437 there remain a large number of problems which the above variations of the present application solve: The waves in the wavy form are much more frequent (switching direction apparently every few centimeters, according to the drawings), thus creating a huge waste of fibers (which can mean more losses and/or need for more amplifiers if these are not holey fibers, and the possibility of losses due to excessive bending), lack of control over the angle of banding, lack of control over the spread of stresses, and ability of the multilayer structure to rotate out of orientation. Of course various combinations of the above and other variations can also be used.

One preferable method of manufacturing the flat multi-fiber jackets is, for example, putting a large number of fiber reels at a sufficiently large area, and pulling them next to each other side by side for example with methods similar to textile factories, and then running them through a machine which extrudes the jackets around them on the fly, or for example letting them pass through an appropriate liquid solution, etc. Preferably, the various reels and relay wheels are computer-controlled for exact coordination, and also there are tension sensors to avoid stressing fibers too much during the process. Preferably, if a fiber gets torn or damaged in the process, this is automatically sensed, and then either the fiber is marked as bad, or the process is temporarily halted d the fiber is preferably fixed by welding, and then the process continues. If the jackets are extruded around the fibers, they can either be extruded to fit exactly around the fibers, or they can be extruded with the right size of holes so that the fibers can have the amount of free space desired. If the fibers pass through some liquid solution for forming the jackets then it is more natural to have no free space between the fibers and the jacket, however even in this method some free space might be created for example by first covering the fibers with some volatile material which evaporates after the jacket has been formed around them, thus leaving the desired free space.

Figure 10C:
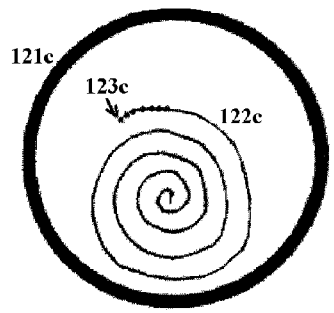

Referring to FIG. 10c, we show another variation: Making for example a flat flexible jacket (122c) of the entire exemplary 20,000 fibers (123c), which would have a width of 30 centimeters in our example, and then rolling it like a Rollada cake and putting it in this form in the metal pipe (121c). The diameter of such a rolled flat jacket with a thickness of 0.1 mm can be about 0.3 cm. This can fit easily in a metal pipe with an inner diameter of 1 or 1.5 cm, and still leave enough room for the rolled jacket to also move freely in the inner pipe space to compensate for stress caused by bending of the metal pipe. However, this would be problematic since in the rolled jacket, the free movement space of for example 100 micron for each fiber is at a different angle depending of its position in the rolled jacket. Therefore, preferably, in the rolled jacket version, the space between each two adjacent fibers in the flat jacket is preferably larger (than in the examples given in FIGS. 10a and b) and the jacket is thinner, for example 30 micron space between each two adjacent 10-micron fibers and a jacket thickness of 0.03 mm (30 micron). This would make the flat jacket of 20,000 fibers with a width of about 800,000 micron=80 cm. Rolled-up, the diameter of this exemplary "rollada" will still be about 0.3 cm. However, if sufficient movement space is given per each fiber in its "mini-cell" within the "rollada", there is no need for the "rollada" to be able to move freely in the pipe, so a larger "rollada", containing more fibers, can be built, filling up more of the inner space of the pipe. Another possible variation is in the other direction—to allow almost no free movement in the cells within the rollada, and rely mainly on the movement of the rollada itself in the pipe. Of course, again, this is just an example, and various numbers and sizes can be used. Other shapes could also be formed from such a flat jacket, for example a zigzag or wavy form. The advantage of the "rollada" solution is that it is relatively easy to manufacture and can be easily used with the normal round pipes. However, since this solution allows free movements in all directions, it is less optimized than the solutions of 12a-b and of 12d, which use directional optimization so that the fibers can move freely more in the direction needed to compensate for stress caused by bends in the pipe, and less in other directions that are not needed, and thus enable safely stacking much more fibers per pipe without increasing the size of the pipe. Smart solutions that do not require enlarging the metal pipe are extremely important since the pipe is the most expensive part of the cable, and since we want to be able to enable as much as possible long consecutive cables that can be laid in one run.

Figure 10D:
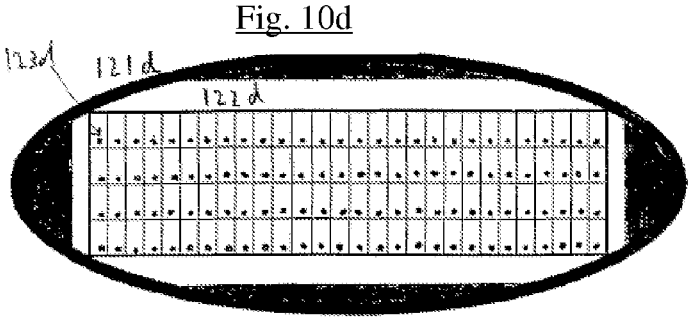
FIG. 10*d* shows a preferable configuration of a multi-layer, preferably flexible, jacket within a preferably somewhat flattened pipe.
Figure 10E:
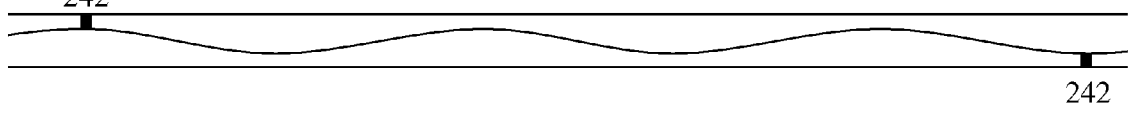
FIGS. 10*e-f* shows a variation where the multi-fiber flat jackets are supported preferably in a wavy fashion, and are preferably coupled together to each other and preferably also to the pipe at certain intervals.
Figure 10F:
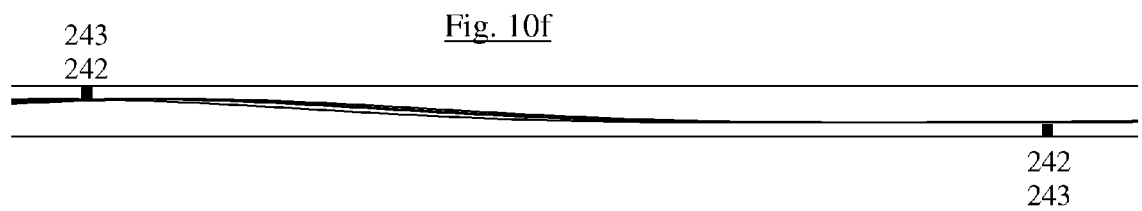

Referring to FIG. 10d, we show a, preferably flexible, multi-layer, preferably elongated square, structure (122) which is already shaped in multi-layer format, without the need to roll it, so that each fiber still has enough room to move freely in its own channel and said structure is preferably within a somewhat flattened pipe (121), in order to make sure that the pipe bends only in the desired direction. Preferably the fibers (123) have more free room to move up and down than sideways. This saves space by giving the fibers free movement especially in the direction that is needed to compensate for stress caused by bends in the pipe and less free movement in the other direction, so that more fibers can be safely stacked together sideways. For the simplicity of the illustration only a small number of "mini-cells" and fibers is shown, but of course the number is actually much larger. Another possible variation of this multi-layer format is having more than 1 fiber per "mini-cell", in order to save materials and space. Stacking more than 1 fiber per each "mini-cell" is also possible with the other configurations described in FIGS. 10a-c.

Figure 11A:
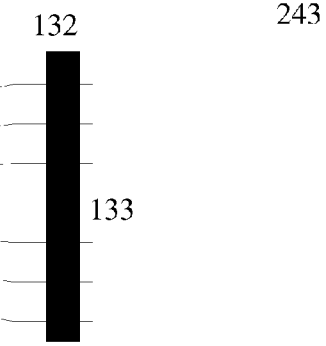
FIGS. 11a-b show an illustration of a few preferable types of connectors that can be conveniently used with the multi-fiber flat jacket, apart from the simple connector that is shown in FIG. 10.
Figure 11B:
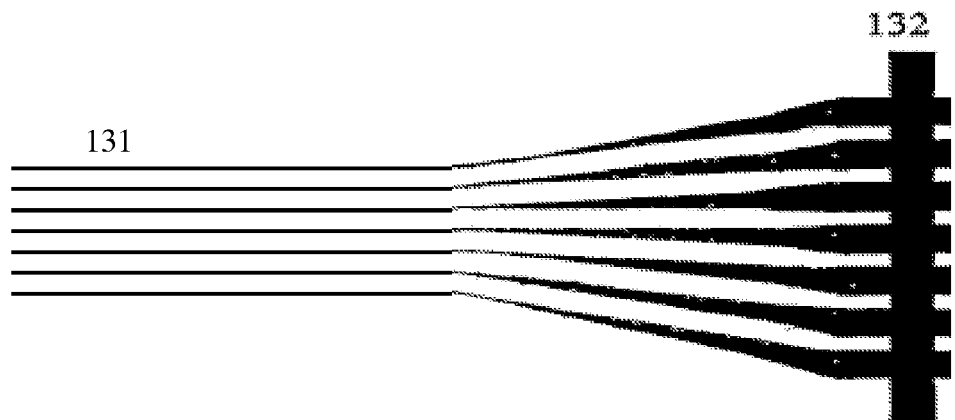

Referring to FIG. 11a-b, we show a multi-fiber flat-jacket connector (132) that is shaped like a fan or delta, so that the distances between the fibers (131) increase near the connector in order to allow more convenient access to the fibers, for example when connecting them to the laser interface that sends the wavelength signals into the fibers or for making stitches between fibers. Preferably, the distances between the fibers at the end of the connector (133) and the orientation (preferably, all pointing at exactly the same direction in parallel) of the fibers (133) are kept extremely accurate, for example by using very accurate filaments between the fibers at the connector (132), which are all of the same size, preferably to a micron-level accuracy or even higher. Preferably, the material of the connector and of these filaments and the material of the flat jacket itself have a very similar thermal expansion coefficient. In FIG. 11a the fibers remain with the same thickness in this "delta". FIG. 11b is very similar to FIG. 11a, except that the fibers are also getting gradually thicker at the delta as they approach the connector. So, for example, if at the last meter or less or few meters of the connector the fibers for example gradually each grow to a thickness of for example 10 times their normal thickness, then for example a flat jacket of 1000 fibers with a normal width of about 1.5 cm will have a connector with the size of approximately 15 cm. For convenient access, preferably the deltas of both FIGS. 11a and 11b can grow to any desired size, for example even 1.5 meters, and in the version of FIG. 11b the growth of the final connector does not have to grow at the same ratio as the growth in the thickness of the fibers, so that, for example, the thickness of each fiber can grow by a factor of 10 and the distances between them can grow even further, so the final size of the connector can still become for example 1.5 meters, even if each fiber grew for example only 10 times in thickness. In either case, the fibers' edges at the end of the connector are preferably already cut very straight and well-polished. Such connectors can help for example at the connection with the lasers that insert the input signals into the fibers, at the connection with the signals detectors, at the area of the amplifiers, in small-distance point-to-point connections, and/or in various junctions or optical splitters at the routers. For connection with the laser diodes such an expanded connector is convenient because the laser diodes are typically each larger than the fiber. The variation described in FIG. 11b is especially important if we move for example to thinner fibers, such as for example 5 micron instead of 10 micron.

Figure 11C:
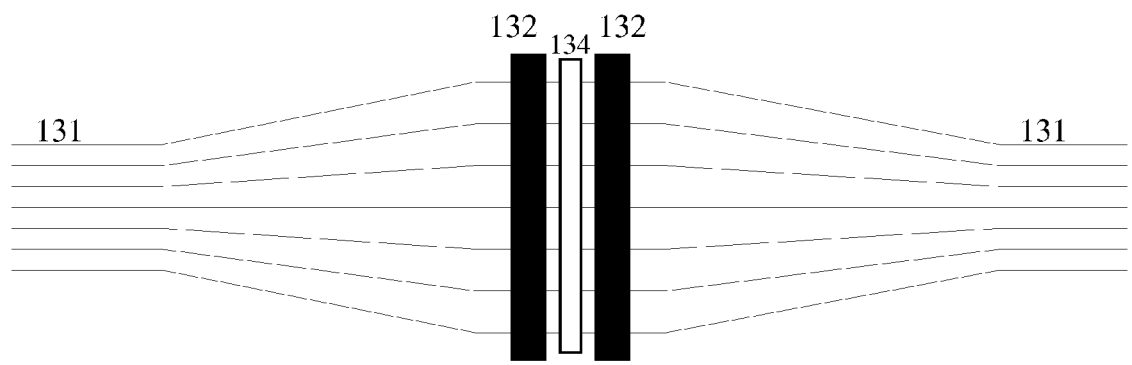
FIG. 11c shows an example of two such connectors in the process of being coupled to each other.

Referring to FIG. 11c, we show a top view illustration of two connectors (132) in the process of being coupled to each other with the aid of a coupling interface (134). When the connection is being made with other fibers, it can either be mechanical, so that two connectors can be mechanically coupled to each other in a way that each fiber is touching and mechanically well coupled to the appropriate fiber as optimally as possible, or (since fused fibers work typically better than a mechanical interface) the connectors can be used for example as a jig to help a fusing machine automatically weld each two fibers together. If the connection is mechanical, the coupling interface (134) can be for example a very exact array of short glass hollow tubes embedded in parallel in a rigid connector of the same material and size as the connectors (132), so that the connectors (132) are exactly coupled mechanically to the interface connector (134) and each hollow glass tube fits exactly over two facing fibers between the two connectors (132). Another possible variation is that in one of the two connectors (132) the fibers get thicker as in FIG. 11b and become hollow at the end, and the fibers at the other connector fit exactly into each hole of the corresponding fiber when the two connectors are coupled to each other. In this case, preferably the thin wires on the other connectors are also getting somewhat fatter, so that the cores on both connectors are similar or identical in size and only the glass claddings on one side are larger then the other and form the walls of the holes. This way the communication direction is independent of the connector type. Otherwise, this kind of connection would be limited to sending signals from the thin side to the fat side, otherwise data could be lost. Another preferable variation is that for example when the two connectors (132) are coupled together, two or more opposite-facing very exact wavy-like clamps are mechanically closed on the fibers from the top and from the bottom and hold all pairs of "stitched" fibers together. A further variation is that preferably some part of these clamps can be slightly moved for example to the right and others slightly moved for example to the left, so that the fibers are held in position with the addition of some force from the right and from the left. Various combinations of these and other variations are also possible.

If the connectors are used as a jig for welding the fibers together, then preferably the two connectors (132) are mechanically coupled together from the sides, leaving free access from above and/or from below to the bare fibers between them, so that each two matching fibers are in very close contact, and then an automatic welding machine sensor can for example reach the connecting point of the two fibers from below or from above, encircle the matching fibers at the connection point (for example by closing a clamp made of two or more half-rings), make automatic adjustments to make the connection optimal, and then weld the two glass fibers with the appropriate heat required. This is done either serially per each pair of matching fibers, or in groups, so that for example each set of 10 or 100 fibers are welded in parallel at the same time, or even the entire set of fibers in the flat cable are welded this way in parallel at the same time. After the welding is finished, preferably the area of the bare fibers is covered from above and from below for protection. If two coupled connectors of welded fibers need to be separated, then preferably a similar reverse process is used, so that again the welded fibers are exposed from the top and/or from the bottom, and for example a similar machine cuts each pair of matching fibers at the connection point and automatically polishes each of the two cut fibers to have a very exact end at 90 degrees to the length of the fiber. This welding can be done also in the variations where in one or both of the connectors the fibers are getting fatter at the connector. These connectors (in either the mechanical connection or the welded connection) are also another solution to the problem of stitching at sea for especially long submarine cables and for easier interface with the amplifiers. Preferably, such stitching is done near or inside one of the amplifiers, to compensate for any attenuation caused by the stitches. Preferably the gradual thickening of the fibers at the edges is created for example by vapor deposition, for example by drawing the fibers slower when the edges are being covered. In the variations where the core itself also becomes thicker at the edges, this can be done for example by gradual different drawing for the fibers at their ends, so that they remain thicker gradually and/or for example by vapor deposition of the same material of the core near the edges, but the variations where the core remains the same and just the cladding gets thicker gradually are more preferable. Another possible variation is that preferably the connector at the end of the individual fiber or for example the other connector that has to connect with the connector end in which the fiber terminates, preferably one of them preferably has a shape like a widening hollow cone and preferably this cone can flexibly bend in any needed direction (preferably in a limited range of angles so that it does not bend out of orientation), so that, even if the fibers are not exactly aligned, the connector that goes into the hollow cone is preferably automatically guided into position. Another possible variation is for example that the widening hollow cone does not bend flexibly and instead the connector end that enters into it is mounted in a flexible way so that the hollow cone guides it into position. Another possible variation is that for example both the hollow cone and the other connector end that goes into it can preferably bend flexibly in a preferably limited range of angles in order to automatically reach the desired fit. Another possible variation is that at least one of the cone and the connector that goes into it can also preferably move automatically for example in a limited range of movement, in order to find automatically the correct position. Preferably the inner (narrower) end of the hollow cone has a sufficiently small diameter to make the other connector reach exactly the desired position and stay there as the connectors are inserted into each other. Another possible variation is that for example instead of or in addition to this arrangement at the end of individual fibers, a similar flexible arrangement for automatically sliding into the correct position is used for example in groups of fibers, so that for example every 10 or 20 or 100 fiber edges (or any other convenient number of fibers) are mounted together on a unit that has this flexibility for the group being connected.

Figure 12:
FIG. 12 is an illustration of a preferable example of limiting the orientation of the flat jackets within a set of 2 (or more) welded together round pipes.

Referring to FIG. 12, we show a preferable example of limiting the orientation of the flat jackets within a set of 2 (or more) round pipes (141). In the shown cross section of the pipes, the flat jackets (142) in each pipe are preferably in an elongated square cell which has a height smaller than the width of the jackets. The empty spaces created at the top and at the bottom are preferably used for electrical wires (144 a-d) for the amplifiers. Additional smaller electrical wires can be used for example in the side spaces. This can also be combined with other solutions, so that for example these wires can be in addition to inner insulated layers of the pipe itself that are used as electrical wires. Of course, in these solutions the pipes are preferably smaller, so that altogether the complex of pipes is not larger than a single pipe of the type used today. Also, more than one cell per pipe can be used sideways and/or bottom-up (For example, even simply dividing each of the two pipes into two cells, one on top of the other, can solve the jacket orientation problem), but one cell per pipe is more efficient. Also, preferably the cells have walls that are straight and parallel to each other, since otherwise one or more flat jackets can get stuck while at one of the extremes and not get down again when needed. Preferably, the cell walls are also made of strong metal.

Figure 13:
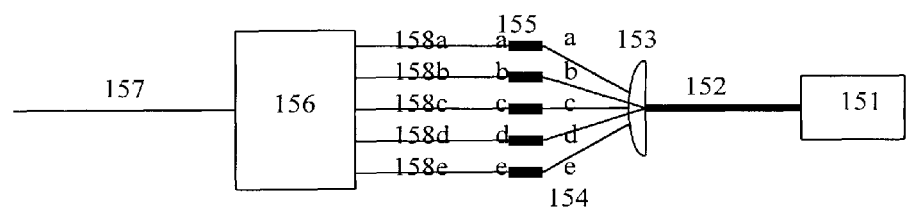
FIG. 13 is an illustration of a preferable example of lowering the price of DWDM lasers and/or increasing their accuracy by optically splitting each laser to discrete sub-frequencies, and then modulating each of them on/off separately.
Figure 14:
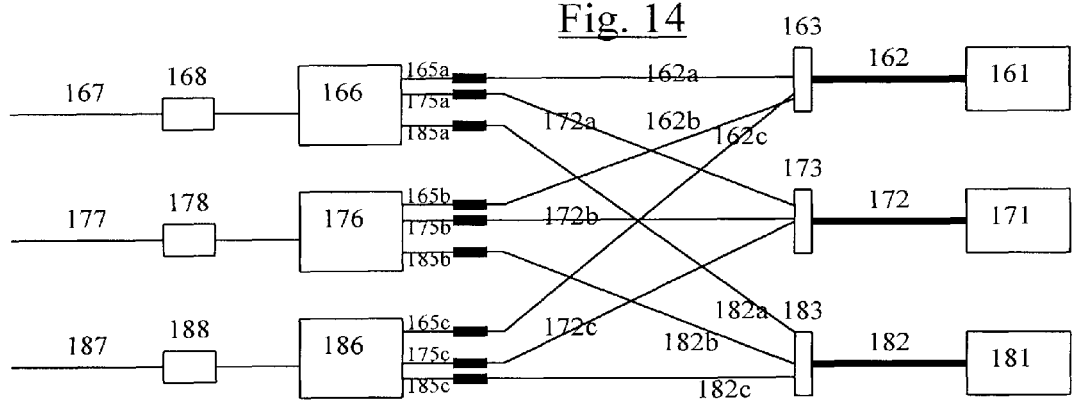
FIG. 14 is an illustration of a preferable example of optically duplicating each original laser beam preferably many times, and then using separate independent on/off modulation on each of the new laser beams and sending each into another fiber (or for example into another core, if for example multi-core holey fibers are used).

Referring to FIG. 13, we show a preferable example of lowering the price of DWDM lasers and/or increasing their accuracy. The light (152) from laser source (151) is optically split for example by an optically diffractive prism (for example in the shape of a triangle or convex lens or round edges) (153), preferably with alternating opaque and transparent stripes, into discrete sub-frequencies (154a-e), and then preferably each sub-frequency is amplified and modulated on/off separately for example by using an electro-absorptive modulator or Mach-Zehnder Modulator or a lithium niobate modulator (155a-e). This can convert each single less precise laser to a group of more precise lasers. In other words each laser can be used for creating a number of wavelengths. The new modulated wavelengths (158a-e) then enter a multiplexor (156) and are inserted into the optic fiber (157). So for example, instead of 120 separate laser sources for 120 wavelengths, for example only 12 lasers can be used, each split for example into 10 wavelengths. For increased efficiency, preferably the amplification and the on/off modulation are conducted simultaneously at the same place, for example by using a filter and on/off-modulating the amplification pump itself. Another possible variation is to use the amplification on the entire set of wavelengths together before or after they enter the fiber. Preferably, at this point the separate beams also pass through a correcting lens that compensates for any smearing caused by the first prism. Preferably this is used in combination with various filters for improving the purity of each wavelength. Another possible variation is for example to optically duplicate the original laser and then use a separate filter or set of filters for each wavelength. An even better solution is to optically duplicate each original laser beam preferably many times, and then use preferably amplification and separate independent on/off modulation on each of the new laser beams and send each into another fiber, as shown in FIG. 14. This way for example each original more expensive and precise laser can be used simultaneously to independently send separate signals into a preferably large number of fibers. Preferably the splitting is done after the filters that further purify the beam, so this saves also on the typically expensive filters. Preferably all of these units are combined on a single chip or for example a number of chips, with preferably many lasers and many fibers per chip.

Figure 15:
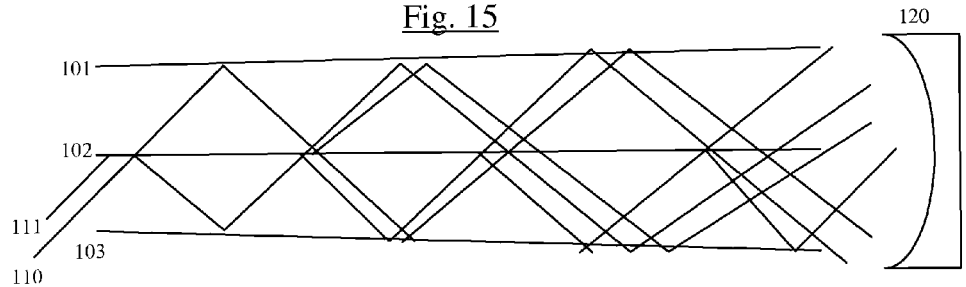
FIGS. 15 & 16 are illustrations of examples of preferable efficient optical splitters that use a combination of two mirrors and at least one semi-transparent mirror for optically duplicating each wavelength a large number of times.
Figure 16:
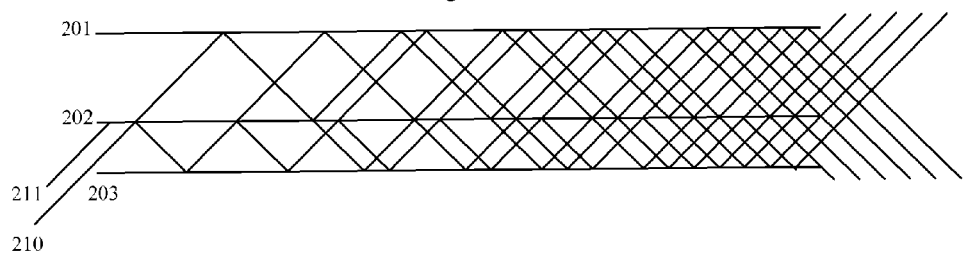

Referring to FIG. 14, we show an illustration of a preferable example of optically duplicating each original laser beam preferably many times, and then using separate independent on/off modulation on each of the new laser beams and sending each into another fiber. For simplicity and clarity, in this example there are shown only 3 wavelengths and 3 fibers, although preferably there are many more wavelengths and many more fibers, such as for example 80-160 wavelengths and for example 100-10,000 or more fibers. The original exemplary 3 wavelengths (162, 172 and 182) originate from 3 preferably high precision laser sources (161, 171, and 181, respectively), preferably each said source containing its set of filters that further purify the beam. Each of these beams is then preferably optically duplicated by duplicators 163, 173 and 183 respectively, into beams 162a-c, 172a-c, and 182 a-c. Each of the resulting new beams is then preferably separately and independently on/off-modulated by modulators 165a-c, 175a-c, 185a-c (which can be for example electro-absorptive modulators or Mach-Zehnder Modulators or lithium niobate modulators), respectively, and then enters the appropriate input line in multiplexors 166, 176, and 186, connected to optical fibers 167, 177 and 187, respectively. Another possible variation is to use the same optical duplicating device for more than one wavelength. Preferably, in each fiber the set of wavelengths in that fiber are then optically amplified, for example by Erbium or Raman amplifiers, to compensate for the reduction in light amplitude after the optical duplication and splitting. So if there are for example 100-1000 fibers and for example 160 wavelengths, this configuration can save a lot of money by using for example only 160 high precision lasers and preferably only for example 160 sets of filters, since each laser typically comes with its typically expensive filter and some of them need also temperature stabilization devices, etc. In this example we also save on amplifiers since we use them only after the wavelengths of each fiber have been entered together, so the only component that needs to be duplicated by the number of wavelengths times the number of fibers is the on/off modulators. Another possible variation is for example to amplify the beams during the duplication, for example by using erbium-doped elements in the duplicators optical elements themselves (for example in the mirrors and/or semi-transparent mirrors described in the reference to FIGS. 15 & 16). Preferably the number of duplicates of each original beam is not too large so that it doesn't weaken the signal too much. In the other direction—another possible variation is to amplify together the signals for more than one fiber, for example with any of the methods described in FIGS. 4-8. Another possible variation of this is to amplify preferably large groups of the beams together for example after the duplicated beams emerge from the duplicators and before they enter the fibers, for example by shining a preferably powerful laser pump (or pumps) on them while they pass through an erbium-doped glass box or for example doing it directly in free space for example by spreading a lot of Erbium particles in the air. This can save a lot of connectors and overheads. Preferably all of these units are combined on a chip, with preferably many lasers and many fibers per chip. On the other hand, due to yield problems in producing the DWDM lasers, another variation is for example to create the part with the high precision lasers separately and then couple it to a chip or chips with the other elements. Another possible variation is that each on/off modulator can handle simultaneously more than one laser beam, in order to save on modulators, for example by dividing each modulator into sub-units that can be each independently controlled. Since each set of lasers can be used this way for many fibers, another possible variation is to use for example more expensive and more powerful lasers. For the optical duplication, one possible variation is for example using a round or elongated magnifying glass for spreading each laser beam, and then collecting parts of the beam and preferably letting them pass through a correcting lens that compensates for the spreading caused by the magnifying glass. Another possible variation is to add for example dark miniature stripes to the magnifying glass, like in FIG. 13, in order to make the spreading beam already discretely divided upon exiting the glass. Another possible variation is to use for example a multi-faceted magnifying glass with each facet straight, instead of a rounded glass, so each resulting beam is not spreading. Another possible variation is to use for example sets of semi-transparent glass that duplicate each entering beam into two or more beams and then continue with the same process recursively on each of the new beams until a sufficient number of beams has been created. Another possible variation is to use for example multi-faceted prisms in a similar recursive fashion. Another possible variation is to use efficient duplicators that do not cause spreading of the beams during the process of the duplication and need much less elements than in the recursive solutions, as shown in FIGS. 15 & 16. Another preferable variation is to use other DOEs (Diffractive Optical Elements) for the duplication, preferably for example Dammann gratings (or other types of gratings), which produce many output beams from each input beam. Although the above has been described regarding on/off modulators, it might be used also with other modulators that may exist in the future. Of course, various combinations can also be used, such as for example using some of the features described in the reference to FIG. 13 in combination with this. Of course the duplications can be done by any means known to the art.

Referring to FIG. 15 we show a top view illustration of an example of a preferable efficient optical splitter that uses a combination of at least two mirrors and at least one semi-transparent mirror for optically duplicating each wavelength a large number of times. For clarity and simplicity we show in this example only one wavelength (110) entering a set of for example vertically standing mirror (viewed from above). Of course this is just an example for convenient viewing, and the mirrors can be also at other angles for example in relation to earth. In this example the two most extreme mirrors (101 and 103) are preferably normal mirrors and the inner mirror (102) is a preferably semi-transparent mirror. Preferably the mirrors are not parallel but with a preferably slight angular spreading, so that for example as we move to the right the distances between the mirrors are preferably slightly increasing. Each time the light beam reaches the semi-transparent mirror it is split into two separate beams and the angle of refraction keeps changing, so that the beams preferably do not overlap. After a number of iterations the wavelength exits on the other side, divided into a preferably large number of duplicates. Of course, by changing the angle of entry the number of resulting duplicates can be easily controlled. At this point preferably the beams pass through a correcting lens (120) that makes them parallel again for more convenient interface with the on/off modulators (For example if many modulator are on the same chip it is more efficient to have them built in parallel). Another possible variation is a multi-faceted correcting lens, or a set of angular mirrors on the right exit points. This correcting lens can be for example a concave parabolic lens. When entering more wavelengths, one possible variation is for example using phase shifting (so that wavelength 111 enters in parallel to wavelength 110), and as they move inside the set of mirrors they tend to grow closer. In this case the result is sets of wavelengths, so that each resulting duplicate beam has the other wavelengths near it upon exiting. Another possible variation is to use for example also the height of the mirrors, so that for example if the mirrors are each 1 cm tall, the first wavelength is reflected back and forth at height 1 mm, and the second wavelength is reflected back and forth at height 2 mms, etc. Of course the actual sizes are much smaller since preferably these are miniature mirrors within a chip. This way for example if we split for example 160 wavelengths into for example 100 duplicates each, the output will be a matrix of light beams where all the duplicates are side by side width-wise and all the wavelengths are side by side height-wise. Another possible variation is to send the wavelengths together into the duplicator and then use a demultiplexor to separate them in each duplicated beam, but that is less efficient. Another possible variation is to use for example 3 inner semi-transparent mirrors instead of 1, which makes the splitting faster so the length of the mirrors can be smaller. Another preferable variation is that, instead of angular deviation, all the mirrors are parallel, and the semi-transparent mirror in the middle is closer to one of the external mirror more than the other, as shown in FIG. 16. Preferably all of these components are combined on a chip, with preferably many lasers and many fibers per chip. Preferably the mirrors and semitransparent mirrors are very accurate in order to prevent distortions in the signals. Of course various combinations of the above and other variations can also be used.

Referring to FIG. 16 we show a top view illustration of an example of a preferable efficient optical splitter that uses a combination of at least two mirrors and at least one semi-transparent mirror for optically duplicating each wavelength a large number of times. For clarity and simplicity we show in this example only one wavelength (210) entering a set of for example vertically standing mirror (viewed from above). Of course this is just an example for convenient viewing, and the mirrors can be also at other angles for example in relation to earth. In this example the two most extreme mirrors (201 and 203) are preferably normal mirrors and the inner mirror (202) is a preferably semi-transparent mirror. Preferably the mirrors are parallel and the semi-transparent mirror in the middle is closer to one of the external mirror more than the other. This way all the exiting beams are parallel (in two groups) and there is no need for a correction to make them parallel. Another possible variation is to make one of the two external mirrors longer, so that both groups exit in the same direction. In this version making the mirrors longer beyond a certain minimum does not create more beams, but by making the angle of entry closer to 90 degrees much more beam/s can be generated (however, in this variation some beams may overlap, so they may come out stronger than others, but this is no problem since they all preferably reach saturation after the amplification). In this version, if more than one semitransparent mirror is used then preferably all of these mirrors are with parallel different distances from each other. Entering additional wavelengths is preferably done as described in the reference to FIG. 15. Of course various combinations of the above and other variations can also be used.

While the invention has been described with respect to a limited number of embodiments, it will be appreciated that many variations, modifications, expansions and other applications of the invention may be made which are included within the scope of the present invention, as would be obvious to those skilled in the art.

We claim:

1. A system for increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the system further comprises arranging the fibers to prevent stress in a configuration capable of containing and/or protecting from stress optic fibers and/or optic fiber cores, with an average density of at least 4 cores per square millimeter, comprising at least one optic fiber cable with at least one pipe and at least one of the following:
    a) At least one multi-fiber flat jacket that can move freely up and down within at least one cell that goes through the optic fiber cable, wherein the at least one cell has a width greater than its height, and the optic fiber cable can bend only in the direction of said height;
    b) At least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height;
    c) A multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;
    d) Optic fibers wherein at least some of said fibers are holey fibers with a diameter of 38 micron or less, including the cladding and coating, which use wavelengths short enough to support a cladding of 10 micron or less in thickness;
    e) Optic fibers wherein at least some of said fibers are nano-fibers which transmit wavelength of visible light and/or shorter;
    f) A system for duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;
    wherein at least some of said fibers are nano-fibers and the wavelengths used are visible light or shorter.

2. A method of increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the method further comprises arranging the fibers to prevent stress in a configuration capable of containing and/or protecting from stress optic fibers and/or optic fiber cores, with an average density of at least 4 cores per square millimeter, comprising using at least one optic fiber cable with at least one pipe and at least one of the following steps:
    a) Using at least one multi-fiber flat jacket that can move freely up and down within at least one cell that goes through the optic fiber cable, wherein the at least one cell has a width greater than its height, and the optic fiber cable can bend only in the direction of said height;
    b) Using at least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height, and wherein said multiple cores are at least one of hollow and non-hollow;
    c) Using a multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;
    d) Using optic fibers wherein at least some of said fibers are holey fibers with a diameter of 38 micron or less, including the cladding and coating, which use wavelengths short enough to support a cladding of 10 micron or less in thickness;
    e) Using optic fibers wherein at least some of said fibers are nano-fibers which transmit wavelength of visible light and/or shorter;
    f) Duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;
    wherein at least some of said fibers are nano-fibers and the wavelengths used are visible light or shorter.

3. A system for increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the system further comprises arranging the fibers to prevent stress in a configuration capable of containing and/or protecting from stress optic fibers and/or optic fiber cores, with an average density of at least 4 cores per square millimeter, comprising at least one optic fiber cable with at least one pipe and at least one of the following:
    a) At least one multi-fiber flat jacket that can move freely up and down within at least one cell that goes through the optic fiber cable, wherein the at least one cell has a width greater than its height, and the optic fiber cable can bend only in the direction of said height;

b) At least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height;

c) A multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;

d) Optic fibers wherein at least some of said fibers are holey fibers with a diameter of 38 micron or less, including the cladding and coating, which use wavelengths short enough to support a cladding of 10 micron or less in thickness;

e) Optic fibers wherein at least some of said fibers are nano-fibers which transmit wavelength of visible light and/or shorter;

f) A system for duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;

wherein at least one of the following arrangements are used:

a) At least one multi-fiber flat jacket that can move freely up and down within at least one cell that goes through the optic fiber cable, wherein the at least one cell has a width greater than its height, and the optic fiber cable can bend only in the direction of said height;

b) At least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height.

4. The system of claim 3 wherein at least one of the following features exist:

a) Connectors at the ends of the flat jackets are expanded like a "delta" so that the distances between the fibers are increased in order to allow more convenient access to them;

b) Connectors at the ends of the flat jackets are expanded like a "delta" so that the distances between the fibers are increased in order to allow more convenient access to them, and the thickness of the fibers at said "delta" is also gradually increasing so that the fiber ends are thicker at the connector;

c) Gradual thickening of the fibers at the edges is created by vapor deposition;

d) A connector at the end of the individual fiber or another connector that has to connect with it has a shape like a widening hollow cone and this connector and/or the other connector that connects to it can flexibly bend in any needed direction in a limited range of angles so that, even if the fibers are not exactly aligned, the connector that goes into the hollow cone is automatically guided into position;

e) A flexible arrangement for automatically sliding into the correct position is used for groups of fibers, so that the fiber edges in each group are mounted together on a widening connector that has this flexibility for the group being connected;

f) At least two pipes which are welded together lengthwise are used and the flat jackets are in an elongated cell within each pipe;

g) At least two pipes which are welded together lengthwise are used and the flat jackets are in an elongated cell within each pipe, and the remaining space is used for electrical wires.

5. A method of increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the method further comprises arranging the fibers to prevent stress in a configuration capable of containing and/or protecting from stress optic fibers and/or optic fiber cores, with an average density of at least 4 cores per square millimeter, comprising using at least one optic fiber cable with at least one pipe and at least one of the following steps:

a) Using at least one multi-fiber flat jacket that can move freely up and down within at least one cell that goes through the optic fiber cable, wherein the at least one cell has a width greater than its height, and the optic fiber cable can bend only in the direction of said height;

b) Using at least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height, and wherein said multiple cores are at least one of hollow and non-hollow;

c) Using a multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;

d) Using optic fibers wherein at least some of said fibers are holey fibers with a diameter of 38 micron or less, including the cladding and coating, which use wavelengths short enough to support a cladding of 10 micron or less in thickness;

e) Using optic fibers wherein at least some of said fibers are nano-fibers which transmit wavelength of visible light and/or shorter;

f) Duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;

wherein at least one of the following arrangements are used:

a) Using at least one multi-fiber flat jacket that can move freely up and down within at least one cell that goes through the optic fiber cable, wherein the at least one cell has a width greater than its height, and the optic fiber cable can bend only in the direction of said height;

b) Using at least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height.

6. The method of claim 5 wherein at least one of the following features exist:

a) Connectors at the ends of the flat jackets are expanded like a "delta" so that the distances between the fibers are increased in order to allow more convenient access to them;

b) Connectors at the ends of the flat jackets are expanded like a "delta" so that the distances between the fibers are increased in order to allow more convenient access to them, and the thickness of the fibers at said "delta" is also gradually increasing so that the fiber ends are thicker at the connector;

c) Gradual thickening of the fibers at the edges is created by vapor deposition;

d) A connector at the end of the individual fiber or another connector that has to connect with it has a shape like a widening hollow cone and this connector and/or the other connector that connects to it can flexibly bend in any needed direction in a limited range of angles so that, even if the fibers are not exactly aligned, the connector that goes into the hollow cone is automatically guided into position;

e) A flexible arrangement for automatically sliding into the correct position is used for groups of fibers, so that the fiber edges in each group are mounted together on a widening connector that has this flexibility for the group being connected;

f) At least two pipes which are welded together lengthwise are used and the flat jackets are in an elongated cell within each pipe;

g) At least two pipes which are welded together lengthwise are used and the flat jackets are in an elongated cell within each pipe, and the remaining space is used for electrical wires.

7. A method of increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the method further comprises arranging the fibers to prevent stress in a configuration capable of containing and/or protecting from stress optic fibers and/or optic fiber cores, with an average density of at least 4 cores per square millimeter, comprising using at least one optic fiber cable with at least one pipe and at least one of the following steps:

a) Using at least one multi-fiber flat jacket that can move freely up and down within at least one cell that goes through the optic fiber cable, wherein the at least one cell has a width greater than its height, and the optic fiber cable can bend only in the direction of said height;

b) Using at least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height, and wherein said multiple cores are at least one of hollow and non-hollow;

c) Using a multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;

d) Using optic fibers wherein at least some of said fibers are holey fibers with a diameter of 38 micron or less, including the cladding and coating, which use wavelengths short enough to support a cladding of 10 micron or less in thickness;

e) Using optic fibers wherein at least some of said fibers are nano-fibers which transmit wavelength of visible light and/or shorter;

f) Duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;

wherein in order to improve the regularity of the shape of nano-fibers and/or of holey nano-fibers at least one of the following is done:

a) Infra red lasers are used to improve an even distribution of the heat, by using laser frequencies in which the conductance of the fibers is much more poor than their optimum;

b) Automatic sensors are used to sense irregularities together with automatic vapor deposition and/or other automatic means to correct them locally.

8. A system for increasing the amount of information transferred in optic fiber cables by increasing the number of optic fiber cores per cable, by at least one of: increasing the number of fibers per cable, increasing the number of cores per fiber, and/or increasing the number of multi-core fibers used, wherein the system further comprises arranging the fibers to prevent stress in a configuration capable of containing and/or protecting from stress optic fibers and/or optic fiber cores, with an average density of at least 4 cores per square millimeter, comprising at least one optic fiber cable with at least one pipe and at least one of the following:

a) At least one multi-fiber flat jacket that can move freely up and down within at least one cell that goes through the optic fiber cable, wherein the at least one cell has a width greater than its height, and the optic fiber cable can bend only in the direction of said height;

b) At least one flat multi-core fiber which contains one or more cores height-wise and more cores width-wise than height-wise and can move freely up and down within at least one cell that goes through the optic fiber cable, wherein the at least one cell has a width greater than its height and the optic fiber cable can bend only in the direction of said height;

c) A multi-layer structure with at least one fiber per cell, wherein at least one of the structure and the fibers within the structure can move up and down to compensate for the bends of the cable's pipe, and the multilayer structure is within a cell that goes through the optic fiber cable, wherein the cell has a width greater than its height, and the optic fiber cable can bend only in the direction of said height;

d) Optic fibers wherein at least some of said fibers are holey fibers with a diameter of 38 micron or less, including the cladding and coating, which use wavelengths short enough to support a cladding of 10 micron or less in thickness;

e) Optic fibers wherein at least some of said fibers are nano-fibers which transmit wavelength of visible light and/or shorter;

f) A system for duplicating the laser sources that send data through the optic fibers, so that original laser beams are optically duplicated and each new beam is independently modulated on/off, so that the same laser sources can be used for multiple fibers and/or multiple cores, and multiple such duplicated beams of different wavelength are entered into the same fibers or cores;

wherein one or more jackets and/or groups of fibers and/or structures which contain optic fibers and/or other arrangements of optic fibers are stitched or glued or otherwise fixed at certain intervals to the cable, so that between said intervals the optic fibers can move more freely relative to the cable compared to the points of coupling to the cable, so that at said intervals multiple fibers are coupled to the cable together as one unit at least at the point of said coupling, and wherein said intervals are lengthwise compared to the length of the cable, and wherein said intervals are at least a few dozen centimeters or more, and at least one of the following features exists:

a) The stitches are made by wires or staples that go through the jackets or structure or structures at the stitch area;

b) The stitch points or some of them or other points of the grouped jackets or of the structure are also stitched or glued or otherwise coupled also to the pipe itself at certain intervals;

c) The coupling to the cable switches its direction each time or at least once in a while;

d) At the areas of coupling to the cable the jackets are typically substantially more far from the opposite internal wall than from the internal wall that they are coupled to;

e) The coupling of the flat jackets to the cable at said intervals also helps ensure that the flat jackets will not rotate out of orientation;

f) The jackets are multi-fiber flat jackets.

9. A method for increasing the amount of information transferred in optic fiber cables by increasing the number of optic fibers per cable, comprising the step of using an optic fiber cable wherein one or more jackets and/or flat jackets and/or bundles of fibers are stitched or glued or otherwise fixed at certain intervals to the cable, and wherein said one or more jackets and/or flat jackets and/or bundles of fibers are loose enough to be able to move and bend between said intervals, so that between said intervals the optic fibers can move more freely relative to the cable compared to the points of coupling to the cable, and so that at said intervals multiple fibers are coupled to the cable together as one unit at least at the point of said coupling, and wherein said intervals are lengthwise compared to the length of the cable, and wherein said intervals are at least a few dozen centimeters or more, and wherein at least one of the following features exists:

a) The jackets or bundles are fixed to the cable at said intervals without an intermediary tube between said jackets or bundles and the cable;

b) Flat jackets are used and the fixing of said flat jackets to the cable at said intervals also helps ensure that the flat jackets will not rotate out of orientation, and the cable can only or mainly bend in the direction in which the flat jackets can move freely up and down;

c) Flat jackets are used and the flat jackets are also stitched to each other at the areas of said fixing to the cable.

10. The method of claim 9 wherein at least one of the following features exists:

a) The stitches are made by wires or staples that go through the jackets or structure or structures at the stitch area;

b) The stitch points or some of them or other points of the grouped jackets or of the structure are also stitched or glued or otherwise coupled also to the pipe itself at certain intervals;

c) The coupling to the cable switches its direction each time or at least once in a while;

d) At the areas of coupling to the cable the jackets are typically substantially more far from the opposite internal wall than from the internal wall that they are coupled to;

e) The coupling of the flat jackets to the cable at said intervals also helps ensure that the flat jackets will not rotate out of orientation;

f) The jackets are multi-fiber flat jackets.

11. The method of claim 9 wherein flat jackets are used and the fixing of said flat jackets to the cable at said intervals also helps ensure that the flat jackets will not rotate out of orientation, and the cable can only or mainly bend in the direction in which the flat jackets can move freely up and down.

* * * * *